United States Patent
Suzudo et al.

(10) Patent No.: US 7,751,457 B2
(45) Date of Patent: Jul. 6, 2010

(54) LASER-DIODE PUMPED SOLID-STATE LASER APPARATUS, OPTICAL SCANNING APPARATUS, IMAGE FORMING APPARATUS AND DISPLAY APPARATUS

(75) Inventors: Tsuyoshi Suzudo, Miyagi (JP); Takunori Taira, Aichi (JP); Yoichi Sato, Aichi (JP); Yasunori Furukawa, Yamanashi (JP); Sadao Matsumura, Yamanashi (JP); Makoto Matsukura, Yamanashi (JP); Osamu Nakamura, Yamanashi (JP); Shinya Watanabe, Yamanashi (JP); Akio Miyamoto, Yamanashi (JP)

(73) Assignees: Ricoh Company, Ltd., Tokyo (JP); National Institutes of Natural Sciences, Tokyo (JP); Oxide Corporation, Yamanashi (JP)

( * ) Notice: Subject to any disclaimer, the term of this patent is extended or adjusted under 35 U.S.C. 154(b) by 142 days.

(21) Appl. No.: 11/812,955

(22) Filed: Jun. 22, 2007

(65) Prior Publication Data
US 2008/0043788 A1 Feb. 21, 2008

(30) Foreign Application Priority Data
Jun. 29, 2006 (JP) ............................. 2006-178884

(51) Int. Cl.
*H01S 5/00* (2006.01)
(52) U.S. Cl. .................................................. 372/50.1
(58) Field of Classification Search .................. 372/22, 372/50.1
See application file for complete search history.

(56) References Cited

U.S. PATENT DOCUMENTS

| | | | |
|---|---|---|---|
| 5,553,088 A | 9/1996 | Brauch et al. | |
| 5,802,086 A * | 9/1998 | Hargis et al. | .............. 372/22 |
| 6,026,101 A | 2/2000 | Suzudo et al. | |
| 6,111,900 A | 8/2000 | Suzudo | |
| 2005/0036531 A1 | 2/2005 | Kan et al. | |
| 2005/0058173 A1 | 3/2005 | Vetrovec | |
| 2005/0226303 A1 | 10/2005 | Suzudo et al. | |
| 2006/0256824 A1 | 11/2006 | Suzudo | |

FOREIGN PATENT DOCUMENTS

JP  06-128076  5/1994

(Continued)

OTHER PUBLICATIONS

"The Radial Selectivity of In-situ Core-doped Crystal Rods Grown by the Double Die EFG Method," P. Rudolph K Shimamura, T. Fukuda, Institute for Material Research, Tohoku University, Sendai, Japan, *Cryst. Res. Technol.*. 29, (1994) 6, pp. 801-807.

*Primary Examiner*—Minsun Harvey
*Assistant Examiner*—Patrick Stafford
(74) *Attorney, Agent, or Firm*—Dickstein Shapiro LLP

(57) ABSTRACT

A laser-diode pumped solid-state laser apparatus comprises at least one laser diode producing a pumping laser light, and at least one laser light generator including a monocrystalline substance doped with a dopant element and pumped with the pumping laser light from at least one laser diode, the monocrystalline substance containing the dopant element with a concentration profile such that the dopant element increases a concentration thereof in a direction perpendicular to a laser oscillation direction gently in the form of a slope from a near zero concentration.

12 Claims, 28 Drawing Sheets

FOREIGN PATENT DOCUMENTS

| | | |
|---|---|---|
| JP | 06-128078 | 5/1994 |
| JP | 06-128089 | 5/1994 |
| JP | 07-307508 | 11/1995 |
| JP | 07307508 A * | 11/1995 |
| JP | 08-278419 | 10/1996 |
| JP | 09-172217 | 6/1997 |
| JP | 2000-101178 | 4/2000 |
| JP | 2000101178 A * | 4/2000 |
| JP | 3266071 | 1/2002 |
| JP | 2002-057388 | 2/2002 |
| JP | 2002-141585 | 5/2002 |
| JP | 2004-152817 | 5/2004 |
| JP | 2004-356479 | 12/2004 |
| JP | 2004356479 A * | 12/2004 |
| JP | 2005-039093 | 2/2005 |
| JP | 2005-327997 | 11/2005 |
| JP | 3759807 | 1/2006 |
| JP | 2006-261431 | 9/2006 |
| WO | WO 03/088432 A2 | 10/2003 |
| WO | WO 2005/091446 A1 | 9/2005 |
| WO | WO 2005/091448 A1 | 9/2005 |

\* cited by examiner

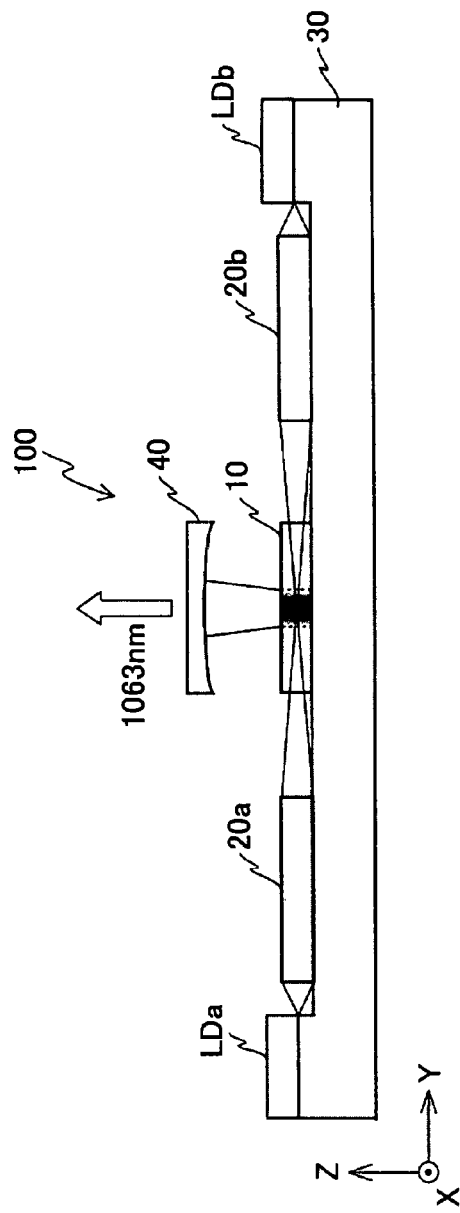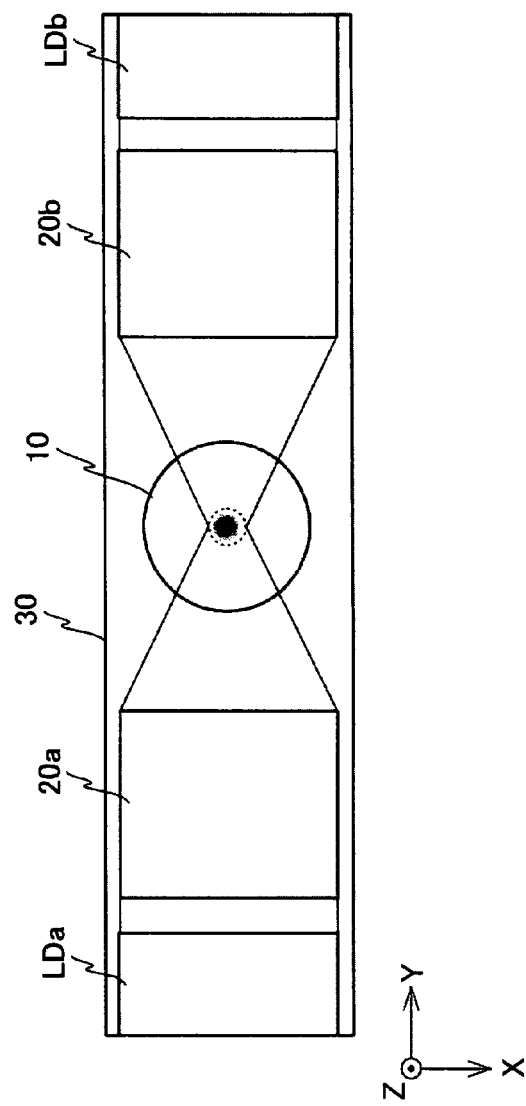
FIG.1A
FIG.1B

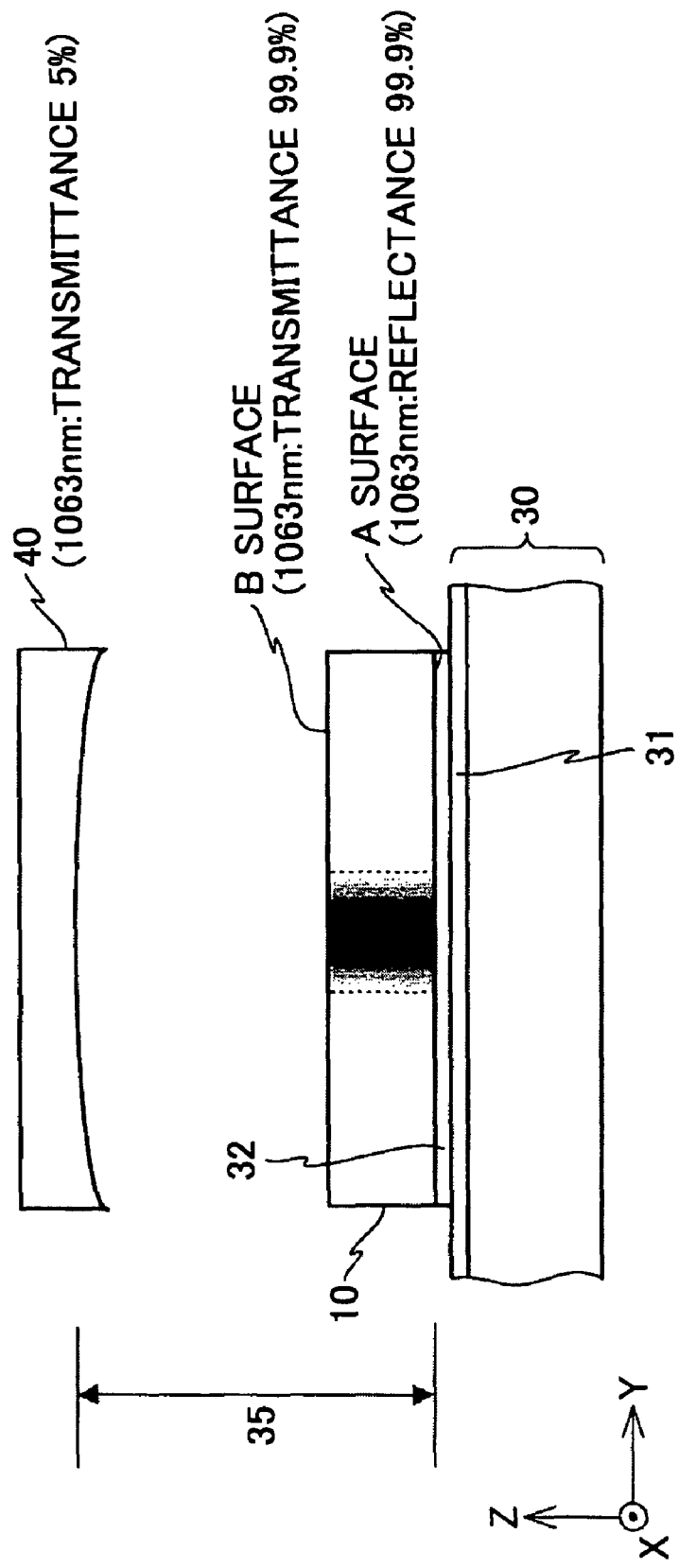

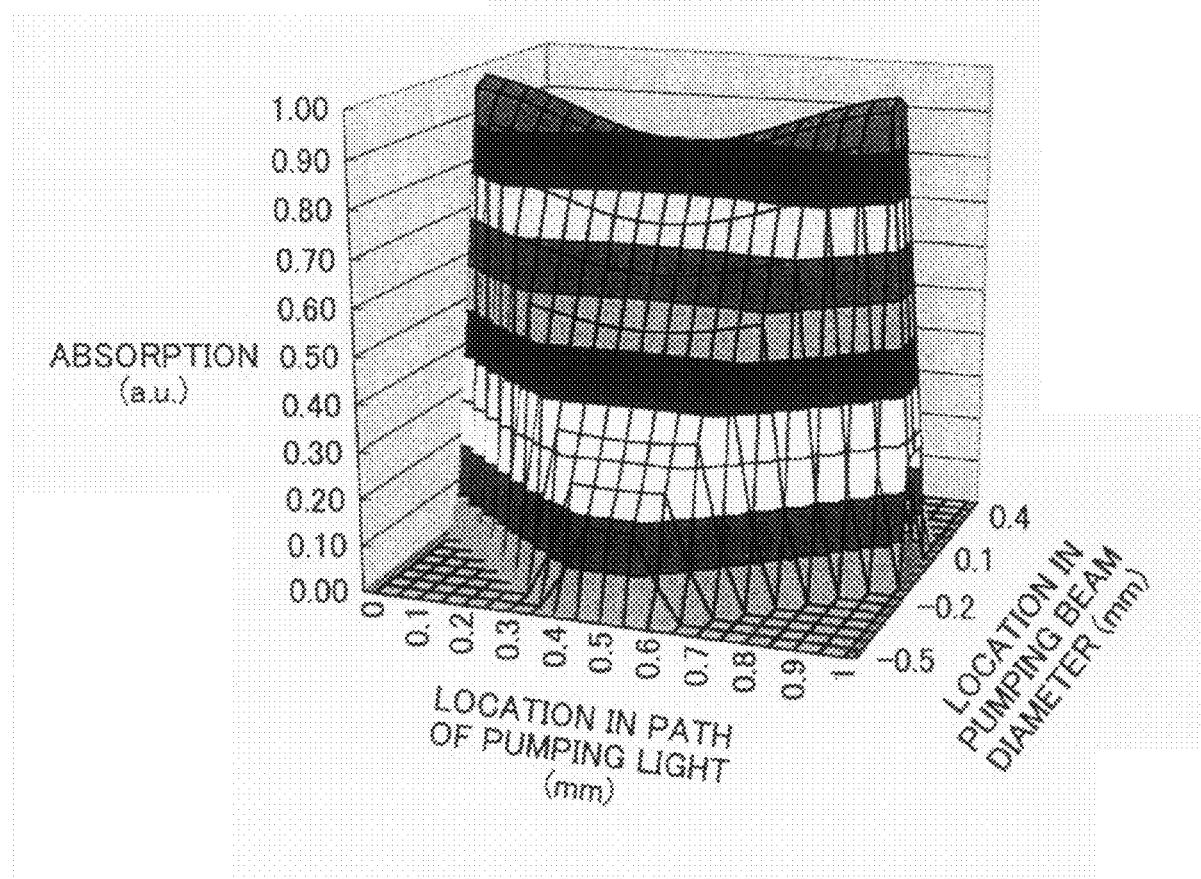

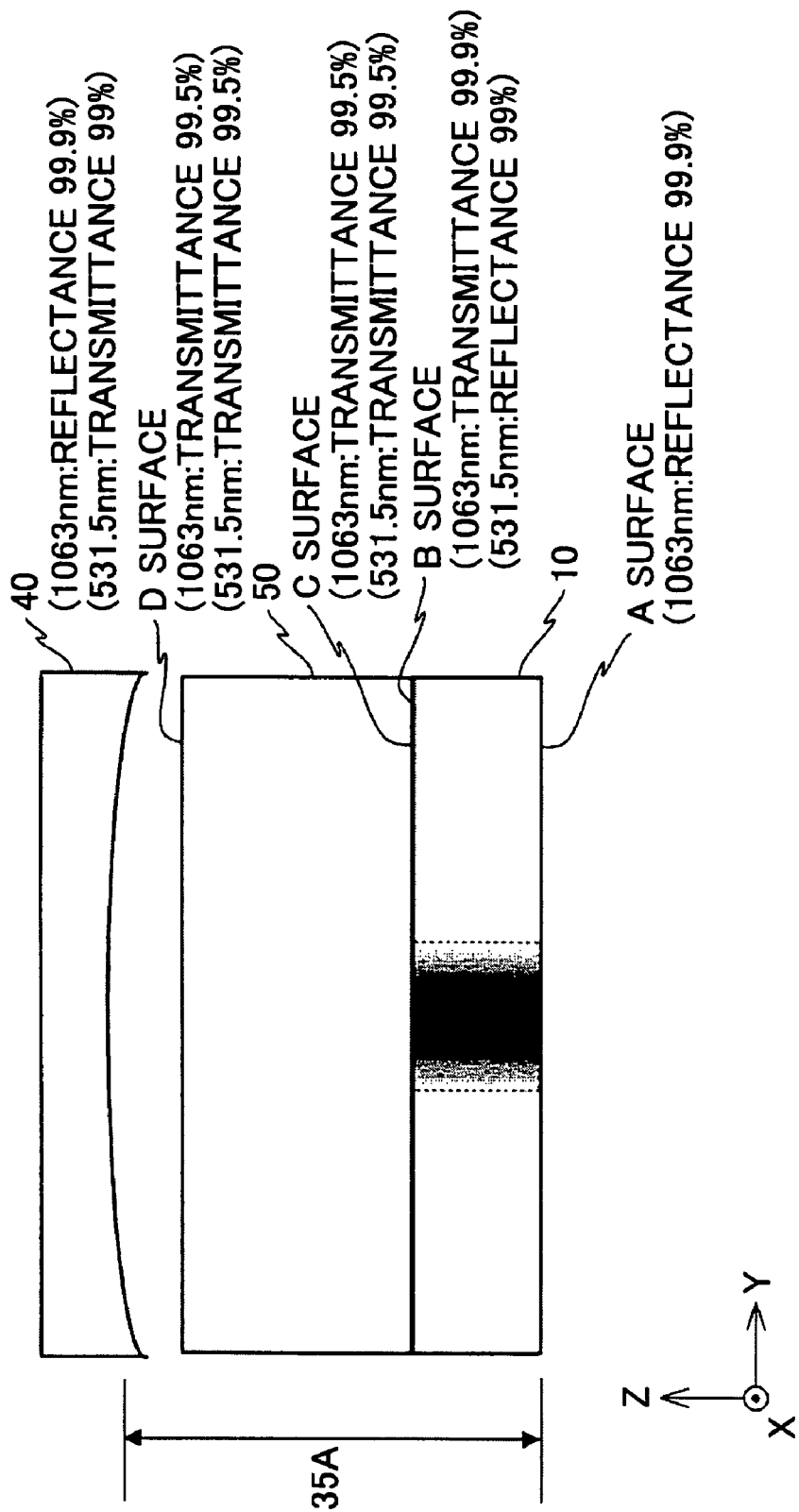

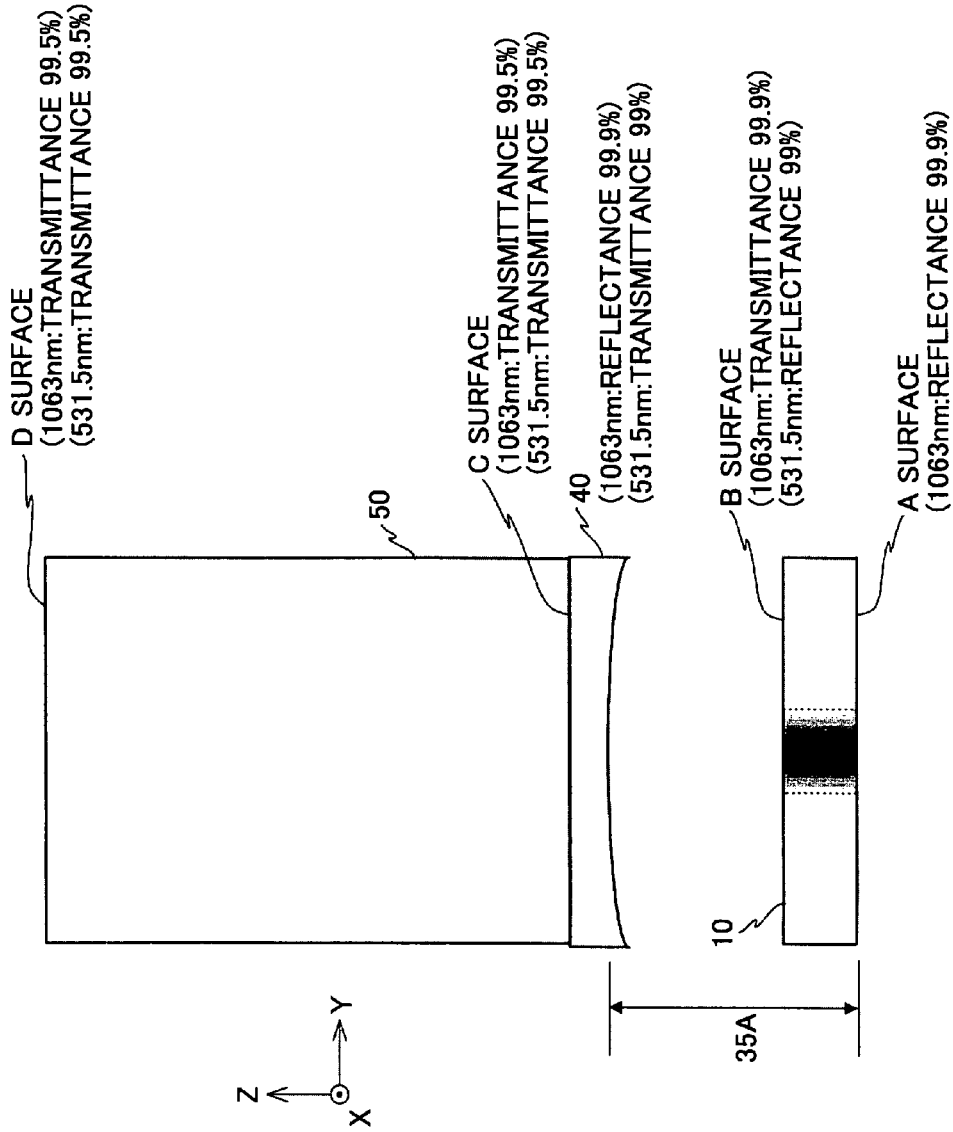

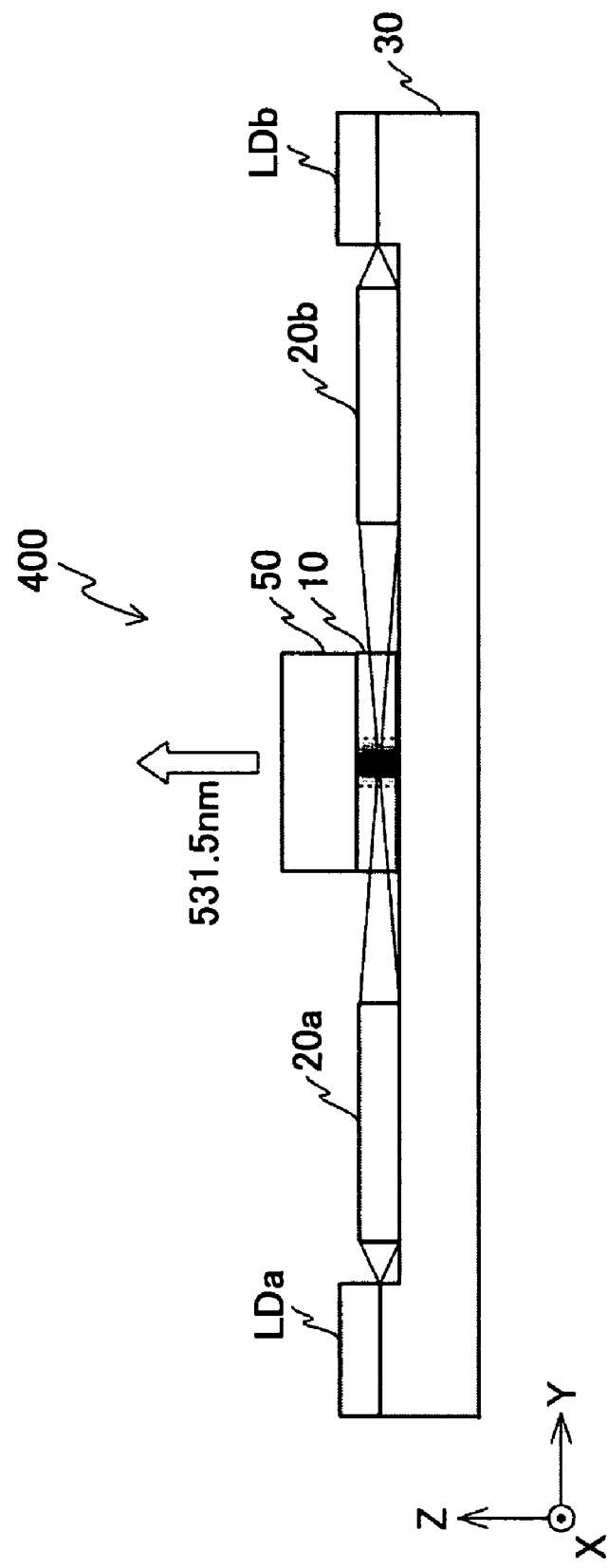

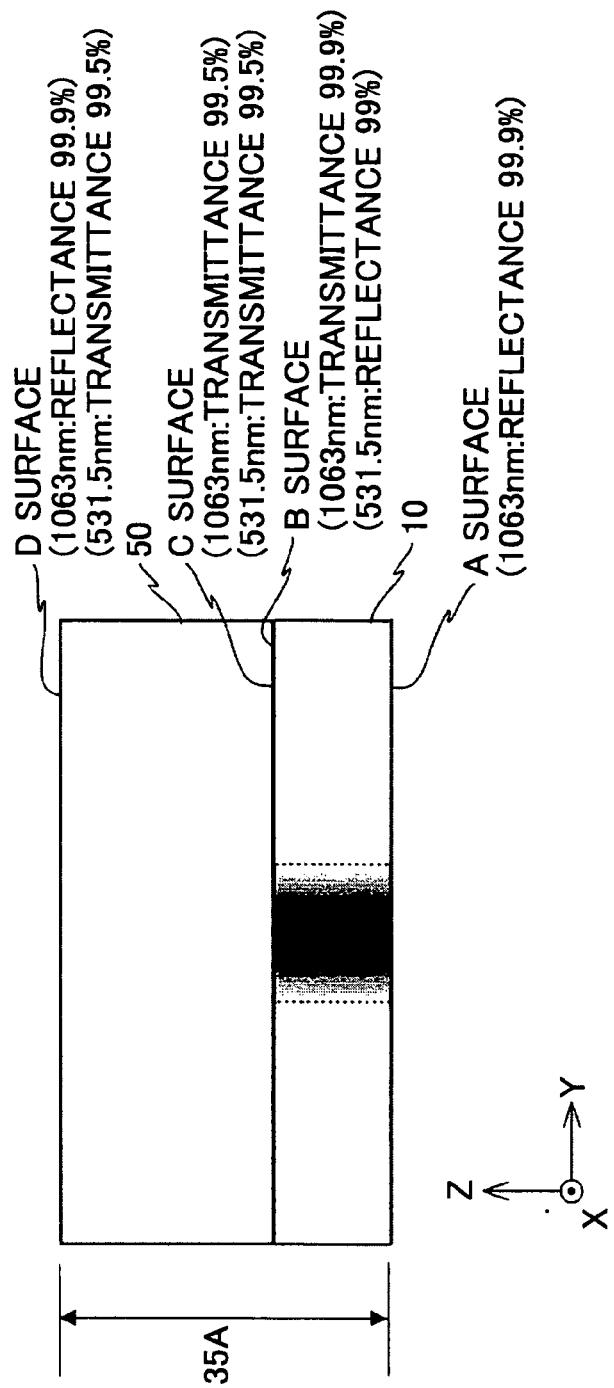

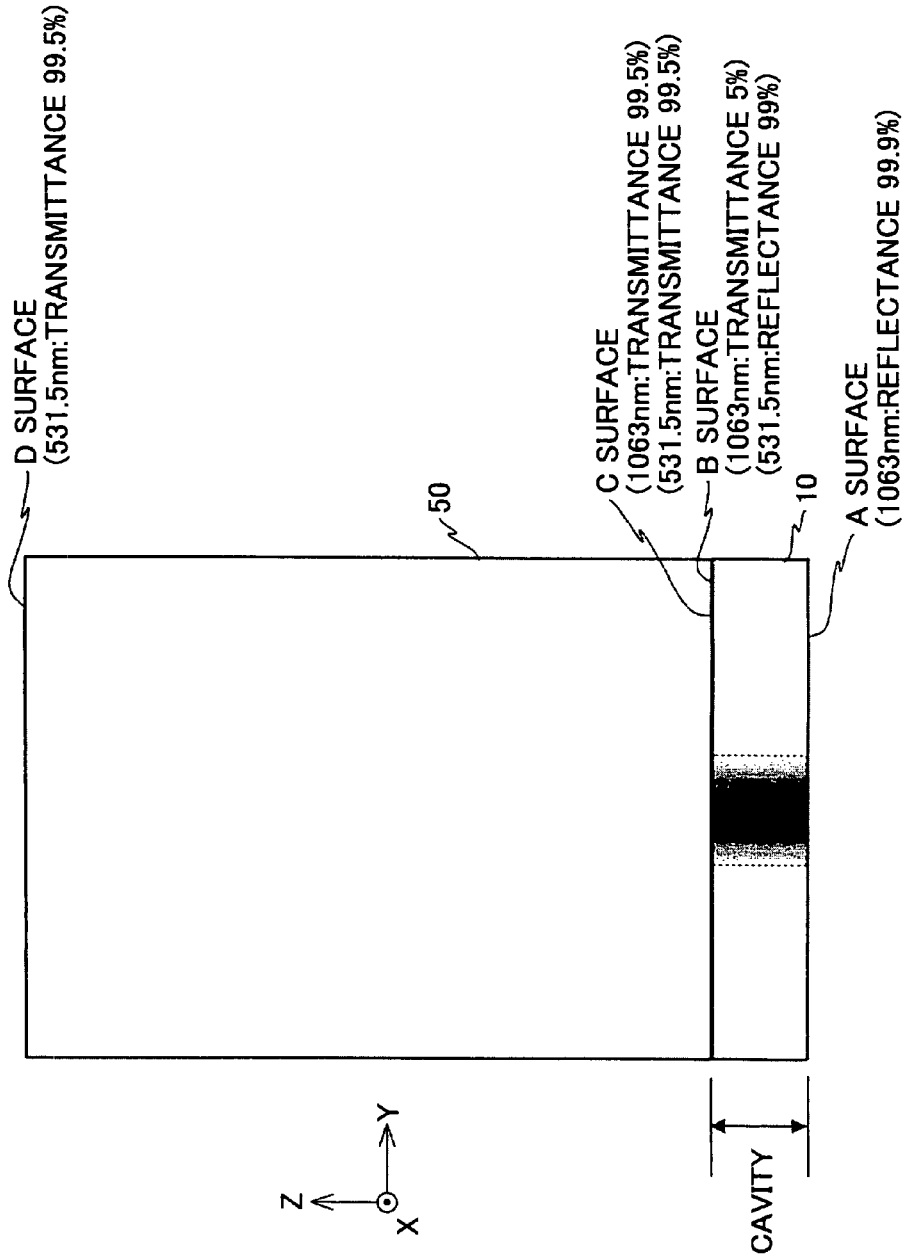

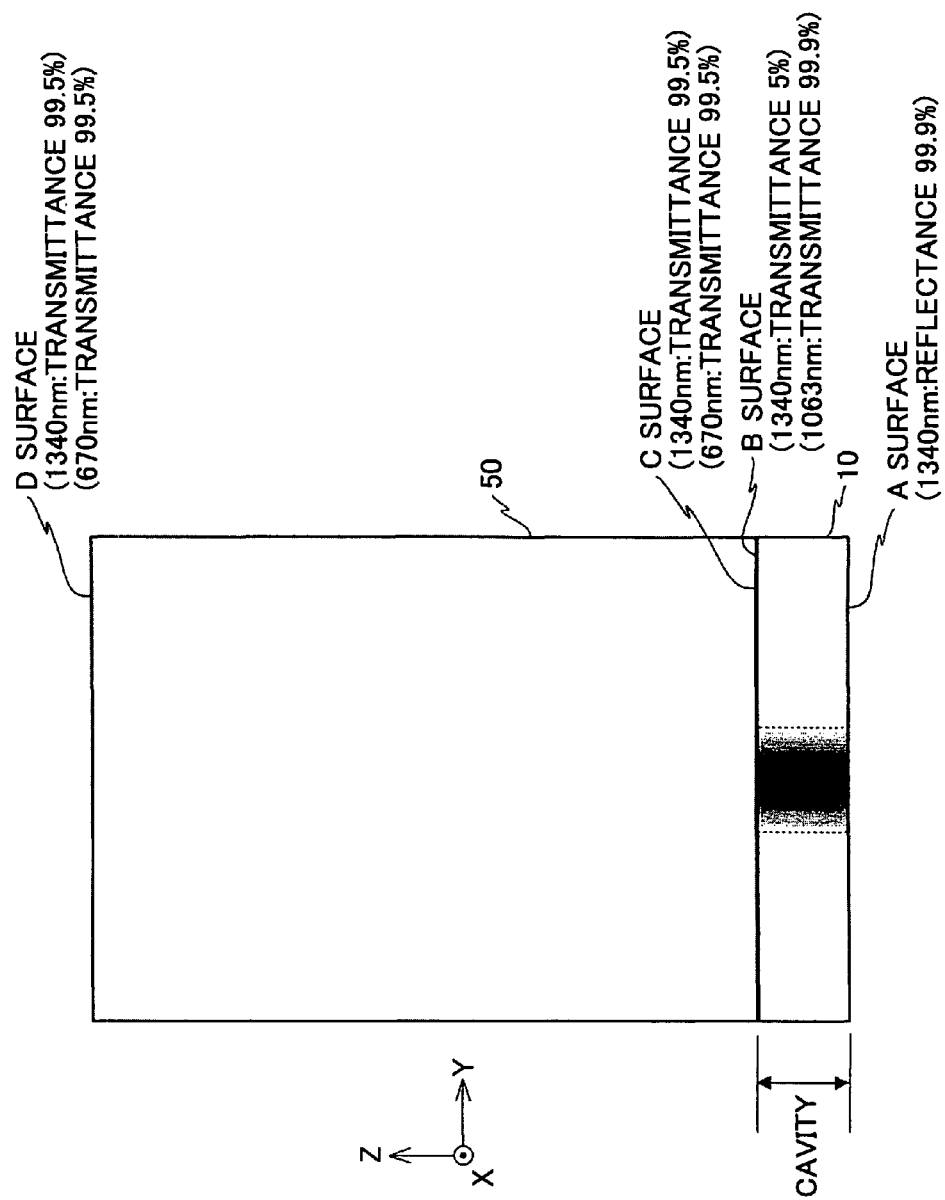

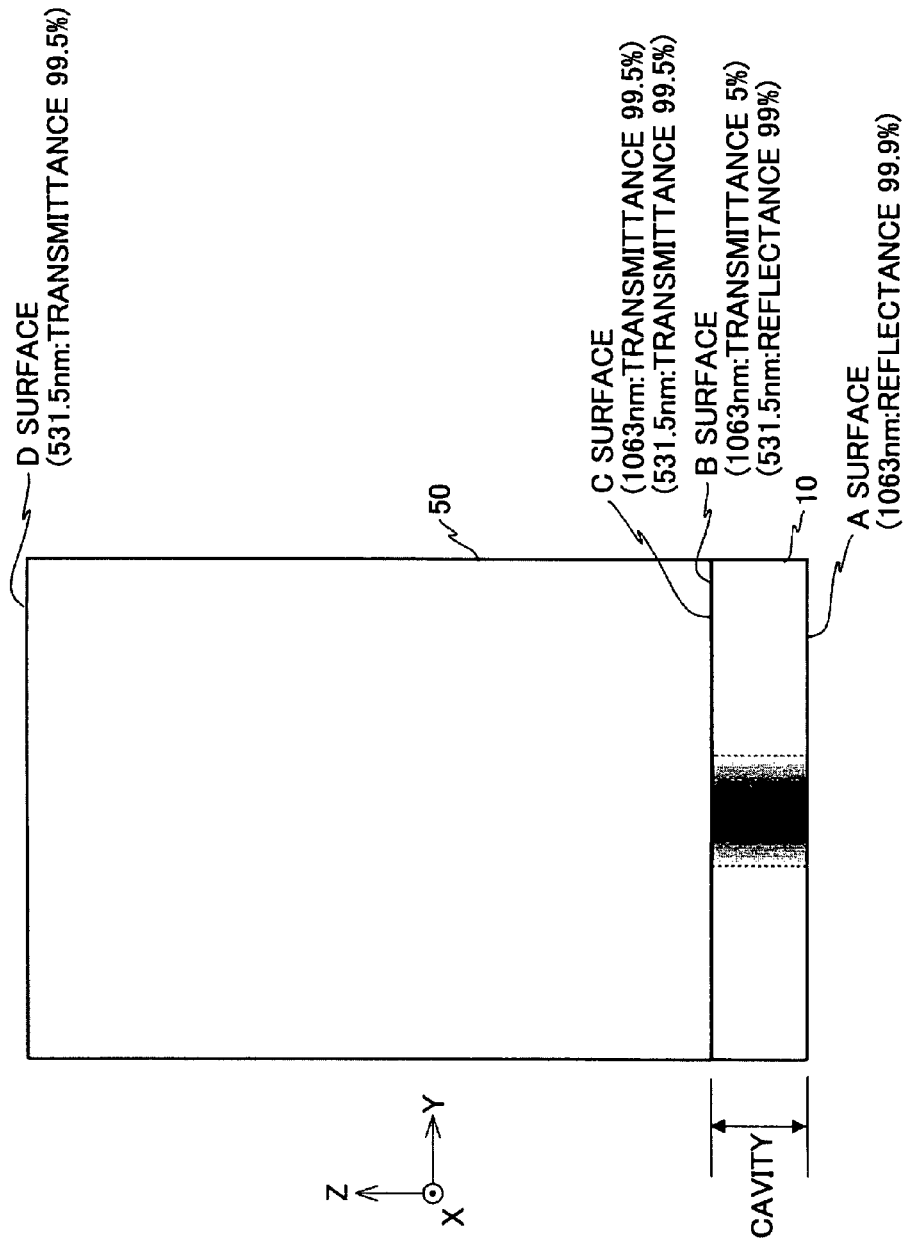

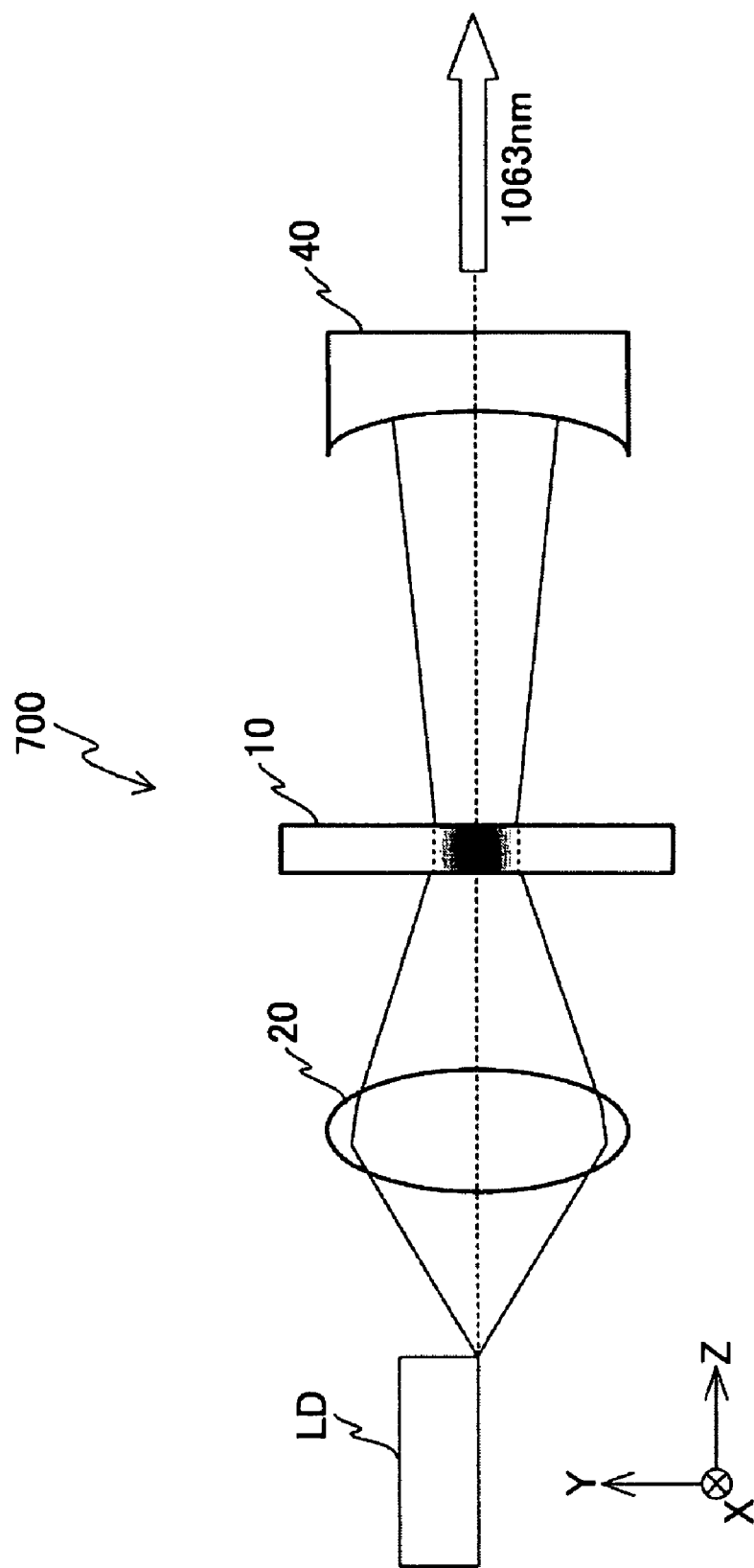

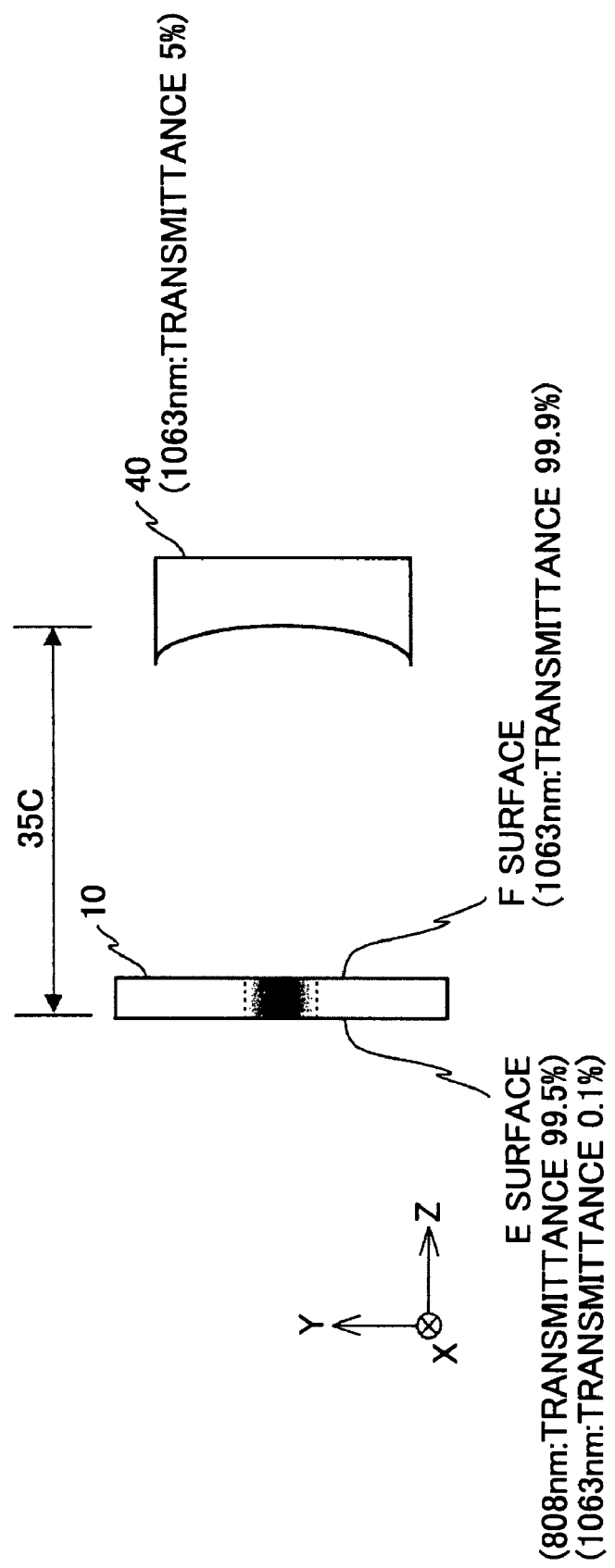

LASER-DIODE PUMPED SOLID-STATE LASER APPARATUS, OPTICAL SCANNING APPARATUS, IMAGE FORMING APPARATUS AND DISPLAY APPARATUS

BACKGROUND OF THE INVENTION

The present invention generally relates to laser-diode pumped solid-state laser apparatuses, optical scanning apparatuses, image forming apparatuses and display apparatuses. More particularly, the present invention relates to a laser-diode pumped solid-state laser apparatus having a solid-state laser crystal in which pumping is caused by laser diode. Further, the present invention relates to any of an optical scanning apparatus, an image forming apparatus or a display apparatus that uses such a laser-diode pumped solid-state laser apparatus.

These days, lasers are used in various fields including laser printers and laser measuring instruments. Further, aiming practical application in future, investigation and development are being made with regard to laser display apparatus or the like. In such apparatuses that use laser light, there is an increasing demand for downsizing of laser source and improvement of laser light quality.

Various proposals have been made with regard to so-called solid-state lasers (see Patent References 1-11, for example).

For example, Patent Reference 1 discloses a solid-state laser oscillation apparatus that uses a laser medium having a doped part and undoped part. Further, Patent Reference 2 discloses a laser apparatus having a gain medium and a waveguide of pumping light, while Patent Reference 3 discloses a laser apparatus having a laser medium and a waveguide optical system.

Further, Patent Reference 4 discloses a method of manufacturing an oxide monocrystal (single crystal) having a core part and a cladding part, while Patent Reference 5 discloses an oxide monocrystal of fiber shape for optical applications formed of a fiber body of an oxide monocrystal and a liquid-phase epitaxial layer of an oxide monocrystal formed so as to cover the surface of the foregoing fiber body. Further, Patent Reference 6 discloses a solid-state laser crystal in which doping concentration of laser-activating ions is increased continuously or stepwise from an end surface where excitation is caused toward an end surface where cooling is made.

Further, Patent Reference 7 discloses a composite laser device having a transparent crystal body including therein a region where laser oscillation can take place and a second crystal body jointed to the transparent crystal body, wherein at least one of the transparent crystal body and the second crystal body is formed of a polycrystalline material. Further, Patent Reference 8 discloses a solid-state laser oscillator having a polycrystalline ceramic composite laser medium in which a polycrystalline transparent ceramic not containing active element and a polycrystalline transparent ceramic doped with an active element are jointed.

Further, Parent References 11 and Non-Patent Reference 1 disclose a composite monocrystal that has regions formed by so-called dual-die EFG (edge-defined film-fed growth) process with different compositions or components.

Patent Reference 1
  Japanese Patent 3,503,588

Patent Reference 2
  Japanese Laid-Open Patent Application 2004-356479

Patent Reference 3
  Japanese Laid-Open Patent Application 2004-152817

Patent Reference 4
  Japanese Patent 3759807

Patent Reference 5
  Japanese Laid-Open Patent Application 8-278419

Patent Reference 6
  Japanese Patent 3266071

Patent Reference 7
  Japanese Laid-Open Patent Application 2005-327997

Patent Reference 8
  Japanese Laid-Open Patent Application 2002-57388

Patent Reference 9
  Japanese Laid-Open Patent Application 6-128089

Patent Reference 10
  Japanese Laid-Open Patent Application 6-128076

Patent Reference 11
  Japanese Laid-Open Patent Application 6-128078

Non-Patent Reference
  P. Rudolph, K. Shimamura and T. Fukuda, "The Radial Selectivity of In-situ Core-doped Crystal Rods Grown by the Double Die EFG Method, Cryst. Res. Technol. vol. 29, 1994, No. 6, pp. 801-807.

SUMMARY OF THE INVENTION

However, with conventional laser optical source, it has been difficult to obtain a high-quality laser light without inviting increase of size of the laser optical source.

Thus, the present invention has been made in view of the foregoing problems and it is a first object of the present invention to provide a laser-diode pumped solid-state laser apparatus capable of providing high-quality laser output without inviting increase of size.

A second object of the present invention is to provide an optical scanning apparatus capable of scanning a surface with high precision.

A third object of the present invention is to provide an image forming apparatus capable of forming high-quality images.

A fourth object of the present invention is to provide a display apparatus capable of displaying information with high display quality.

In a first aspect, the present invention provides a laser-diode pumped solid-state laser apparatus, comprising:

at least one laser diode producing a pumping laser light; and at least one laser light generator comprising a monocrystalline substance doped with a dopant element (optical emission center: rare earth element or transitional metal element) and pumped with said pumping laser light from said at least one laser diode, said monocrystalline substance containing said dopant element with a concentration profile such that said dopant element increases a concentration thereof in a direction perpendicular to a laser oscillation direction gently in the form of a slope from a near zero concentration.

According to the present invention, in which at least one laser light generator used therein comprises the monocrystalline substance doped with the dopant element (optical emission center: rare earth element or transitional metal element) excited by the pumping laser light from the at least one laser diode, with the concentration profile such that the dopant element increases a concentration thereof from near zero concentration gently in the form of a slope in the direction perpendicular to the laser oscillation direction, it is easily possible to attain the desired distribution of optical absorption in the monocrystalline substance. Further, there is no need with the present invention to shape the excitation laser light, and it becomes possible to provide a laser output of high beam quality, without inviting increase of size of the solid-state laser apparatus.

In a second aspect, the present invention provides an optical scanning apparatus scanning a surface by an optical beam, wherein the optical scanning apparatus comprises at least one laser-diode pumped solid-state laser apparatus of the present invention for producing the optical beam.

According to the present invention, in which the optical scanning apparatus comprises at least one laser-diode pumped solid-state laser apparatus as set forth above, it becomes possible to scan the surface with the optical beam with high precision as a result.

In a third aspect, the present invention provides an image forming apparatus forming an image on an object by using a laser light, wherein the image forming apparatus comprises at least one laser-diode pumped solid-state laser apparatus as set forth above for producing the laser light.

According to the present invention, in which the image forming apparatus comprises at least one laser-diode pumped solid-state laser apparatus as set forth above, it becomes possible to form high-quality images as a result.

In a fourth aspect, the present invention provides a display apparatus displaying information by using laser light, wherein the display apparatus comprises at least one laser-diode pumped solid-state laser apparatus as set forth above for producing the laser light.

According to the present invention, in which the display apparatus comprises at least one laser-diode pumped solid-state laser apparatus as set forth above, it becomes possible to attain high-quality display of information as a result.

BRIEF DESCRIPTION OF THE DRAWINGS

FIGS. 1A and 1B are diagrams for explaining a laser-diode pumped solid-state laser apparatus according to a first embodiment of the present invention;

FIG. 3 is a diagram for explaining a cavity in FIG. 1A;

FIG. 7 is a diagram for explaining the absorption amount in a three-dimensional plot for the case of uniform Nd concentration in a core part;

FIGS. 8A and 8B are diagrams for explaining a laser-diode pumped solid-state laser apparatus according to a second embodiment of the present invention;

FIGS. 9A and 9B are diagrams for explaining a laser-diode pumped solid-state laser apparatus according to a third embodiment of the present invention;

FIGS. 10A and 10B are diagrams for explaining a laser-diode pumped solid-state laser apparatus according to a fourth embodiment of the present invention;

FIGS. 11A and 11B are diagrams for explaining a laser-diode pumped solid-state laser apparatus according to a fifth embodiment of the present invention;

FIGS. 13A and 13B are diagrams for explaining a solid-state laser apparatus 600R of FIG. 12;

FIGS. 15A and 15B are diagrams for explaining a solid-state laser apparatus 600G of FIG. 12;

FIGS. 16A and 16B are diagrams for explaining a laser-diode pumped solid-state laser apparatus according to a seventh embodiment of the present invention;

DETAILED DESCRIPTION OF THE PREFERRED EMBODIMENTS

<<Laser-Diode Pumped Solid-State Laser Apparatus>>

First Embodiment

Figure 2A:
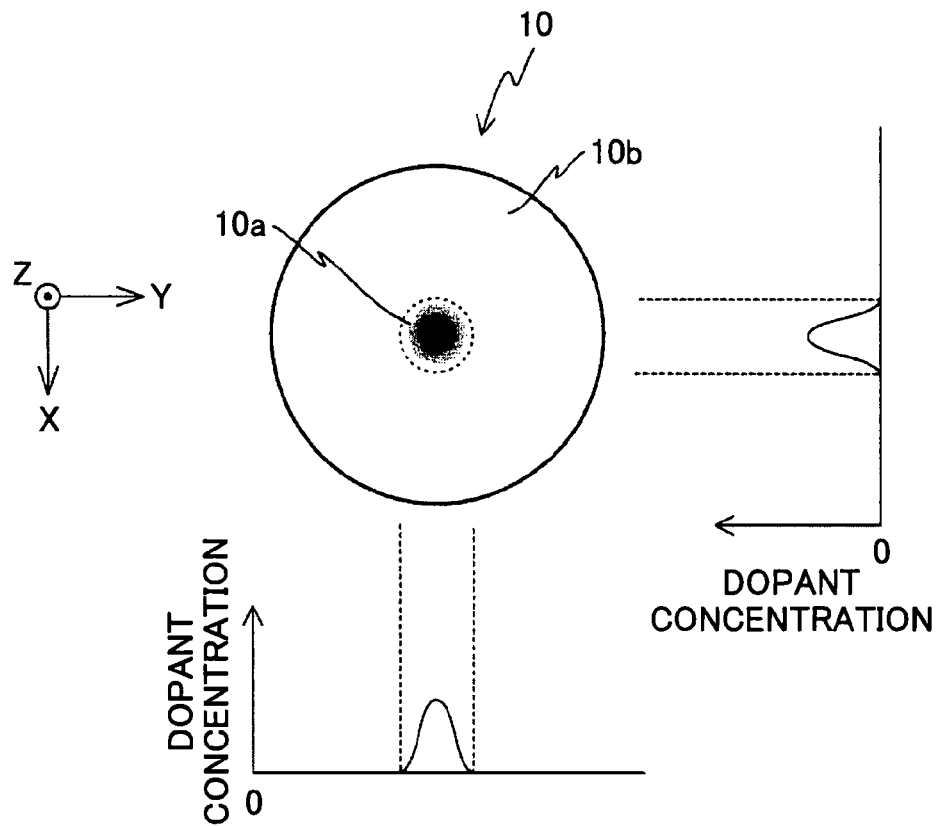
FIGS. 2A and 2B are diagrams for explaining the solid-state laser crystal of FIGS. 1A and 1B.

Hereinafter, a laser-diode pumped solid-state laser apparatus according to a first embodiment of the present invention will be described.

FIGS. 1A and 1B show the schematic construction of a laser-diode pumped solid-state laser apparatus 100 according to a first embodiment of the present invention. In the present invention, explanation will be made based on the coordinate system in which Z-axis is chosen in the laser oscillation direction and X and Y-axes are chosen in a plane perpendicular to the Z-axis with mutually perpendicular relationship.

Referring to FIGS. 1A and 1B, the laser-diode pumped solid-state laser apparatus 100 of the present embodiment is an apparatus of so-called side-pumped type and includes two laser diode array elements LDa and LDb for the purpose of pumping, a solid-state laser crystal 10, an output mirror 40, and a heat sink 30.

The two laser diode array elements LDa and LDb are disposed on the +Z-side of the heat sink 30 in a manner so as to face each other in the Y-axis direction, wherein each of the laser diode array elements LDa and LDb produces a pumping laser light of the wavelength of 808 nm with the output power of 40 W. In the illustrated example, the laser diode array LDa emits the pumping laser light in the +Y direction while the laser diode array LDb produces the pumping laser light in the −Y direction.

Further, there are provided two optical systems 20a and 20b respectively in correspondence to the laser diodes LDa and LDb, wherein each of the optical systems 20a and 20b is formed by a combination of plural lenses and is disposed on the +Z side of the heat sink 30. Thereby, it becomes possible to form an optical spot on the incident surface of the solid-state laser crystal 100 with a size of 100 μm (in the thickness direction of the solid-state laser crystal 10: Z-axis direction)×

1000 μm (X-axis direction). Here, the optical system 20a is deposed at the +Y side of the laser diode array LDa and focuses the pumping laser light therefrom. Further, the optical system 20b is deposed at the −Y side of the laser diode array LDb and focuses the pumping laser light therefrom.

The solid-state laser crystal 10 is disposed on the +Z side of the heat sink 30 at the +Y side of the optical system 20a and at the −Y side of the optical system 20b.

Figure 2B:
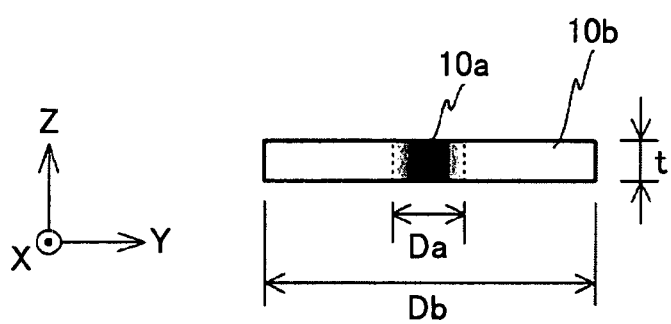

As shown in FIGS. 2A and 2B, the solid-state laser crystal 10 may be a uniaxial monocrystal of gadolinium vanadate ($GdVO_4$) having a disk shape (or chip shape), wherein it should be noted that the solid-state laser crystal 10 is doped with neodymium (Nd) as the dopant element (emission center) excited by the pumping laser light from the laser-diode array elements.

As represented in the example of FIG. 2A, the concentration profile of Nd has a sloped shape in which the Nd concentration increases gradually from near zero concentration in the direction perpendicular to the direction of laser oscillation (Z-axis direction in the present case). Hereinafter, the part contributing to laser oscillation will be designated as "core part 10a" and the part scarcely contributing to laser oscillation will be designated as "cladding part 10b". Thus, the solid-state laser crystal 10 is integrally formed of the core part 10a and the cladding part 10b.

In the present example, the core part 10a is a circular part of a diameter Da located at a central part of the solid-state laser crystal 10, while the cladding part 10b is a donuts shape part surrounding the core part 10a.

As shown in the example of FIG. 2A, the concentration of Nd in the core part 10a becomes maximum near the center of the core part 10a and decreases gradually toward the cladding part 10b. In one example, the Nd concentration near the center of the core part 10a is about 0.5 at %. Thereby, the Nd concentration profile has a shape resembling a Gauss distribution profile.

In one example, the solid-state laser crystal 10 is formed by slicing a rod-shaped monocrystal (columnar crystal) ingot manufactured by the dual-die EFG process explained before or by a μPD process and may have a thickness t of 0.5 mm, a diameter Db of 5 mm and a diameter Da of 1 mm. It should be noted that the solid-state laser crystal 10 is a crystal that is designed to emit a laser light of linear polarization upon excitation by optical pumping.

Further, as shown in FIG. 3, the surface of the solid-state laser crystal 10 at the side where the heat sink 30 is provided (the surface at −Z side, designated as "A surface" for the sake of convenience) is provided with a coating providing a reflectance of 99.9% for the light of a wavelength of 1063 nm. Further, as shown in FIG. 3, the surface of the solid-state laser crystal 10 at the side opposite to the side where the heat sink 30 is provided (the surface at +Z side, designated as "B surface" for the sake of convenience) is provided with a coating providing a transmittance of 99.9% for the light of the wavelength of 1063 nm.

On the surface of the coating at the A surface, there is formed a metal layer 32 of Cr/Ni/Au laminated structure, wherein the metal layer 32 is jointed to an Au—Sn alloy layer 31 formed on the heat sink 30.

Further, there is disposed an output mirror 40 at the +Z side of the solid-state laser crystal 10. This output mirror 40 has a radius of curvature of 5000 mm at the −Z side surface and has a transmittance of 5% to the light of the wavelength of 1063 nm.

Thereby, there is formed a cavity 35 by the A surface of the solid-state laser crystal 10 and the output mirror 40 as shown in FIG. 3.

In the illustrated example, the distance between the A surface of the solid-state laser crystal 10 and surface of the output mirror 40 at the −Z side is set to 100 mm. Further, the laser light forms a beam of the beam diameter of 0.5 mm inside the solid-state laser crystal 10.

It should be noted that the output mirror 40 may have a so-called microchip construction integrated with the solid-state laser crystal 10.

Next, the operation of the laser-diode pumped solid-state laser apparatus 100 of the foregoing construction will be explained briefly.

Referring to FIG. 1, the laser diode array LDa emits a pumping laser light with the wavelength of 808 nm, wherein the emitted pumping laser light is injected into the solid-state laser crystal 10 at a side surface thereof after passing through the optical system 20a. Similarly, the laser diode array LDb emits a pumping laser light with the wavelength of 808 nm, wherein the emitted pumping laser light is injected into the solid-state laser crystal 10 at a side surface thereof after passing through the optical system 20b.

Thereby, the Nd dopant in the solid-state laser crystal 10 undergoes excitation by the pumping laser light and there is caused laser oscillation by the cavity 35 formed by the A surface of the solid-state laser crystal 10 and the output mirror 40 (see FIG. 3) with the wavelength of 1063 nm. That laser light of the wavelength of 1063 nm is then emitted after passing through the output mirror 40.

Figure 4:
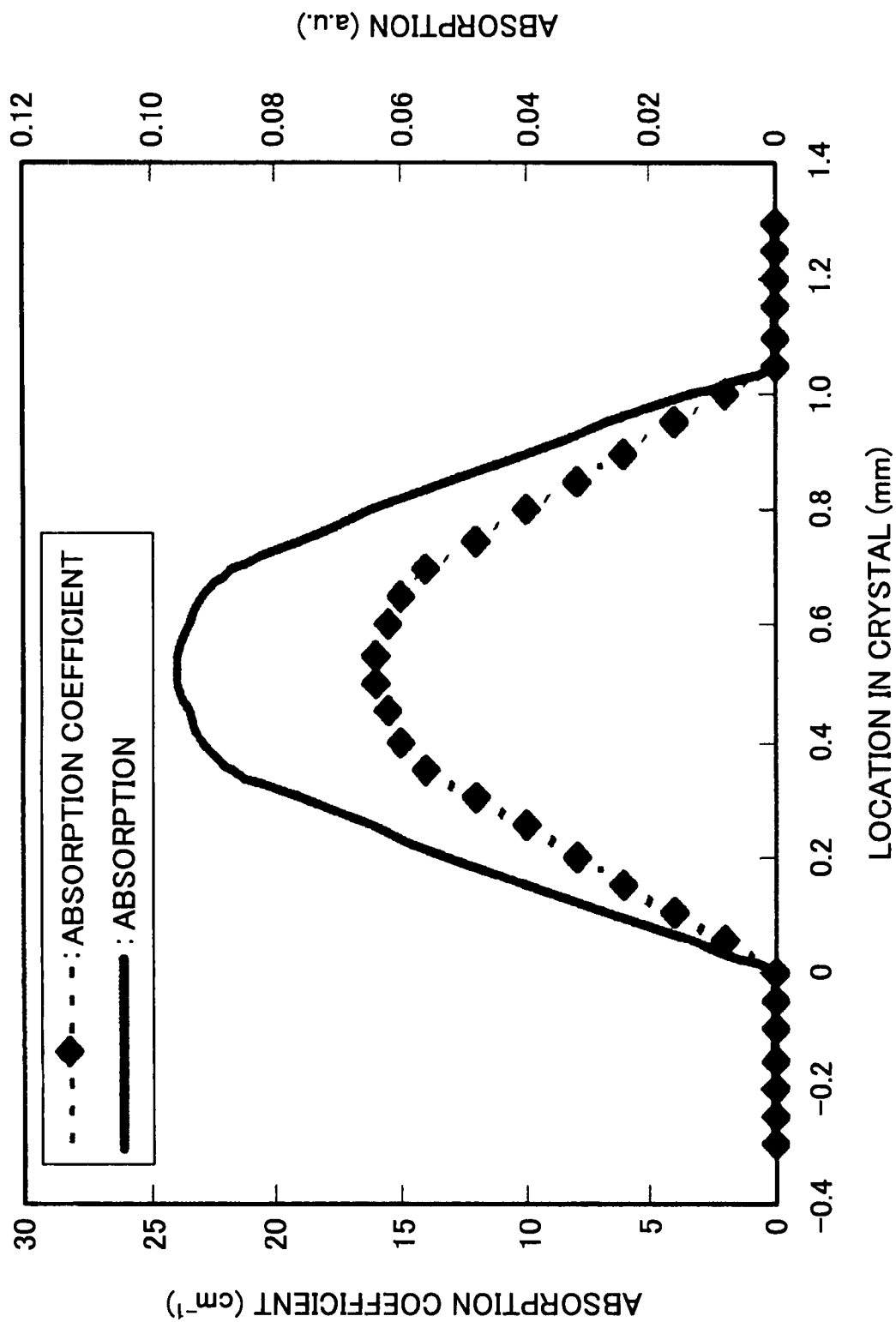
FIG. 4 is a diagram for explaining the absorption coefficient and absorption amount in the solid-state laser crystal of FIGS. 2A and 2B.
Figure 5:
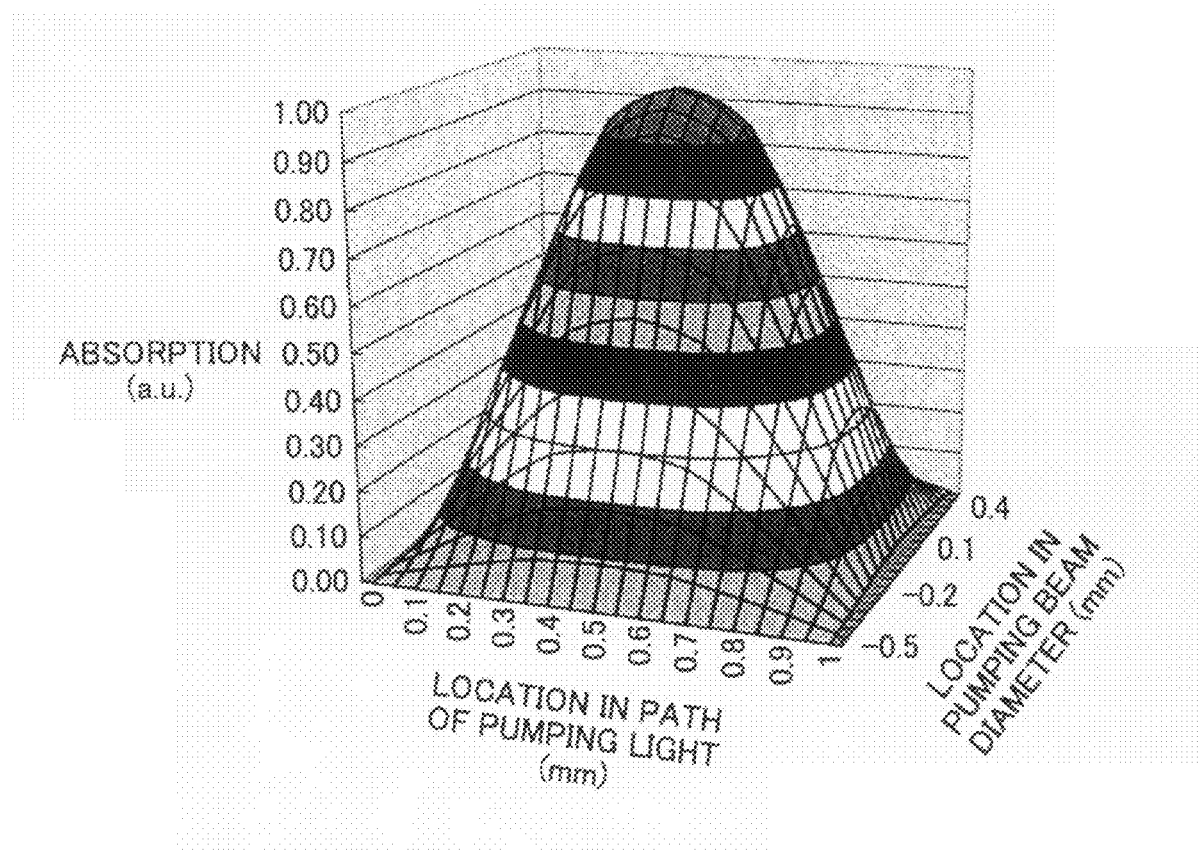
FIG. 5 is a diagram for explaining the absorption amount in the solid-state laser crystal of FIGS. 2A and 2B in a three-dimensional plot.

As explained above, the laser-diode pumped solid-state laser apparatus 100 of the first embodiment is thus provided with the solid-state laser crystal 10 that includes a uniaxial monocrystal of gadolinium vanadate ($GdVO_4$) doped with Nd, which undergoes excitation by the pumping laser lights from the two pumping laser diode array elements LDa and LDb, wherein Nd is doped with such a concentration profile that the concentration of Nd increases gradually in the sloped shape from near zero concentration in the direction perpendicular to the laser oscillation direction (Z-axis direction in the present example). As a result, it is easily attained the absorption profile such as those shown in FIGS. 4 and 5, in which there appears a peak of absorption at the central part of the solid-state laser crystal 10. With this, a lateral mode of excellent Gaussian distribution is attained for the laser light output therefrom (designated hereinafter as "output laser light" for the sake of convenience).

Figure 6:
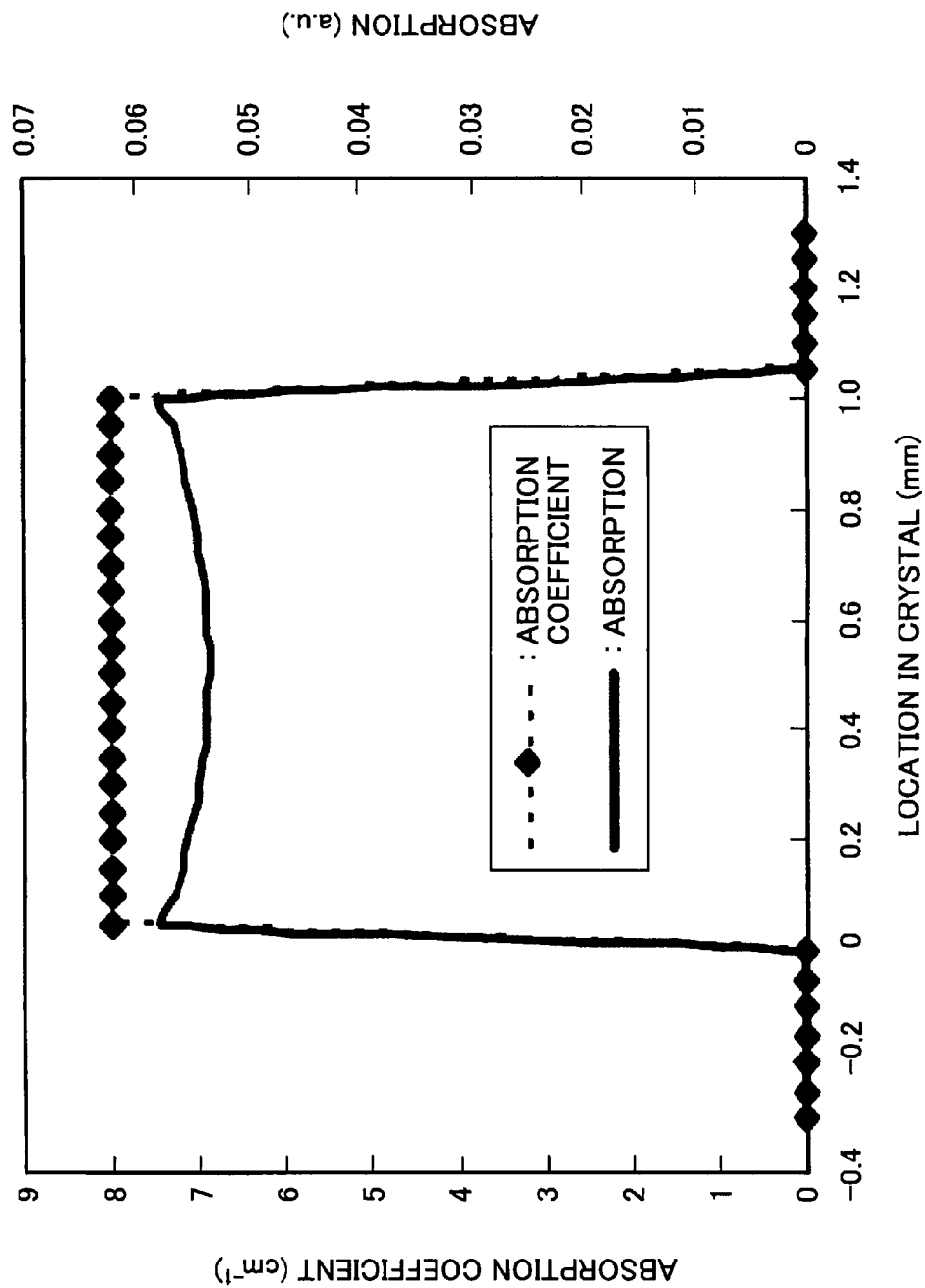
FIG. 6 is a diagram for explaining the absorption coefficient and absorption amount for the case of uniform Nd concentration in a core part.

Meanwhile, in the case a solid state laser crystal having a uniform Nd concentration profile for the core part, and thus having a sharp increase of Nd concentration from near zero concentration, is used for the laser-diode pumped solid-state laser apparatus of side pumping construction, there occurs strong and sharp absorption for the pumping laser light injected from the side surface as shown in FIGS. 6 and 7, and it becomes difficult to attain an output laser light of excellent beam quality. Thus, in this case, it is advisable to provide a correction mechanism for correcting the beam quality, while such correction mechanism invites increase of size and cost of the laser apparatus. In addition, such a construction requires adjustment of the correction mechanism.

Further, according to the laser-diode pumped solid-state laser apparatus 100 of the first embodiment, the heat generated in the solid-state laser crystal 10, originating from the energy difference between the pumping laser light and the output laser light, is radiated directly via the A surface, and it becomes possible to suppress the temperature rise of the solid-state laser crystal 10. As a result, it becomes possible to achieve high power operation of the laser-diode pumped solid-state laser apparatus 100.

It should be noted that, in the event there is a uniform Nd concentration in the core part, it should be noted that there arises a heat distribution profile similar to that of the absorption profile in the solid-state laser crystal, while such heat distribution profile induces a change of refractive index (thermal lens effect), leading to further deterioration of the beam quality.

With the laser-diode pumped solid-state laser apparatus 100 of the first embodiment, it is possible to optimize the heat distribution profile by adjusting the concentration profile of Nd in the solid-state laser crystal 10. Thus, with the laser-diode pumped solid-state laser apparatus 100 of the first embodiment of the present invention, it becomes possible to provide an output laser light of excellent beam quality without providing a correction mechanism for the change of refractive index (thermal lens effect).

Thus, according to the laser-diode pumped solid-state laser apparatus 100 of the first embodiment, it becomes possible to output a laser light of the wavelength of 1063 nm with excellent beam quality and with high output power.

While the first embodiment has been explained for the case of the output laser light has the wavelength of 1063 nm, the present invention is not limited to such a particular construction. For example, by appropriately choosing the specification of coating of the solid-state laser crystal 10 and the optical properties of the output mirror 40, it is also possible to obtain an output laser light of the wavelength of 912 nm or 1340 nm.

Second Embodiment

Hereinafter, a laser-diode pumped solid-state laser apparatus according to a second embodiment of the present invention will be described with reference to FIGS. 8A and 8B.

Figure 8A:
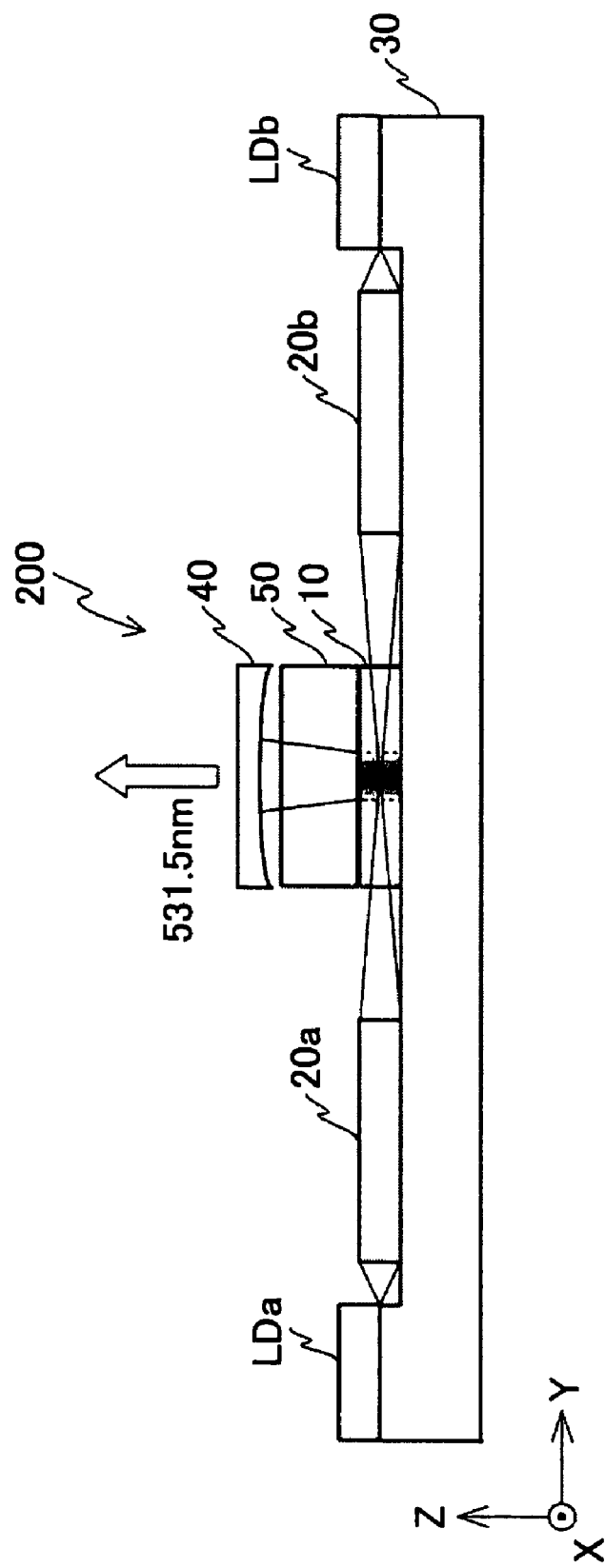

FIG. 8A shows the schematic construction of a laser-diode pumped solid-state laser apparatus 200 according to a second embodiment of the present invention.

Referring to FIG. 8A, the laser-diode pumped solid-state laser apparatus 200 has a construction similar to that of the laser-diode pumped solid-state laser apparatus 100 of the first embodiment, except that there is disposed a non-linear optic crystal 50 on the optical path of the laser light between the solid-state layer crystal 10 and the output mirror 40 and that the optical properties of the output mirror 40 is different and the specification of the coating of the solid-state laser crystal 10 is different. Otherwise, the construction of the present embodiment is the same as the first embodiment.

Hereinafter, explanation will be made mainly on the difference over the first embodiment. Thereby, it should be noted that the same reference numerals are used for the parts identical to or equivalent to the parts of the first embodiment and the description thereof will be simplified or omitted.

The non-linear optic crystal 50 converts the laser light of the wavelength of 1063 nm of the fundamental mode to a laser light of the wavelength of 531.5 nm forming a second harmonic mode. For this non-linear optic crystal 50, a PPMgLN device (a device of $LiNbO_3$ having a periodically inversed polarization structure doped with MgO) may be used. This non-linear optic crystal 50 has a length of 5 mm (in the X-axis direction and Y-axis direction) and a thickness of 2 mm (in the Z-axis direction). Thereby, the non-linear optic crystal 50 is disposed with such an orientation that the crystal axis thereof points the direction in which there is attained a pseudo phase matching condition with the polarization direction of the laser light inside the cavity. On both end surfaces of the non-linear optic crystal 50, there are provided a coating providing a transmittance of 99.5% or higher for both the fundamental mode light of the wavelength of 1063 nm and the second harmonics light of the wavelength of 531.5 nm. In the explanation below, the surface at the −Z side of the non-linear optic crystal 50 will be designated as C surface, while the surface at the +Z side will be designated as D surface.

On the surface (A surface) of the solid-state laser crystal 10 jointed to the heat sink 30, there is provided a coating having a reflectance of 99.9% with regard to the light of the wavelength of 1063 nm as shown in FIG. 8B. Further, as shown in FIG. 8B, there is provided a coating on the surface (B surface) opposite to the A surface of the solid-state laser crystal 10, such that the coating provides the transmittance of 99.9% for the light of the wavelength of 1063 nm and the reflectance of 99% for the light of the wavelength of 531.5 nm. With this, it is possible to suppress the incidence of the second harmonic wave generated inside the cavity to penetrate into the solid-state layer crystal 10.

The output mirror 40 has a radius of curvature of 5000 mm at the −Z side surface and has a reflectance of 99.9% to the light of the wavelength of 1063 nm and the transmittance of 99% to the light of the wavelength of 531.5 nm.

Thereby, there is formed a cavity 35A by the A surface of the solid-state laser crystal 10 and the output mirror 40 as shown in FIG. 8B.

Next, the operation of the laser-diode pumped solid-state laser apparatus 200 will be explained briefly.

Referring to FIG. 8A, the laser diode array LDa emits a pumping laser light with the wavelength of 808 nm, wherein the emitted pumping laser light is injected into the solid-state laser crystal 10 at a side surface thereof after passing through the optical system 20a. Similarly, the laser diode array LDb emits a pumping laser light with the wavelength of 808 nm, wherein the emitted pumping laser light is injected into the solid-state laser crystal 10 at a side surface thereof after passing through the optical system 20b.

Thereby, the Nd dopant element in the solid-state laser crystal 10 undergoes excitation by the pumping laser light and there is caused laser oscillation by the cavity 35A formed by the A surface of the solid-state laser crystal 10 and the output mirror 40 (see FIG. 8B) with the wavelength of 1063 nm. Thereby, the laser light of the wavelength of 1063 nm is confined inside the cavity 35A and forms the fundamental mode. Thereby, because the non-linear optic element 50 is disposed inside the cavity 35A, the confined fundamental mode wave undergoes wavelength transition, resulting in generation of the second order harmonics, and the laser light of the wavelength of 531.5 nm is formed as the second order harmonics, wherein this laser light of the wavelength of 531.5 nm is outputted through the output mirror 40.

As explained above, the laser-diode pumped solid-state laser apparatus 200 of the second embodiment is thus provided with the solid-state laser crystal 10 that includes a uniaxial monocrystal of gadolinium vanadate ($GdVO_4$) doped with Nd, which undergoes excitation by the pumping laser lights from the two pumping laser diode array elements LDa and LDb, wherein Nd is doped with such a concentration profile that the concentration of Nd increases gently in the sloped shape from near zero concentration in the direction perpendicular to the laser oscillation direction (Z-axis direction in the present example). As a result, it is easily attained the desired absorption profile in which there appears a peak of absorption at the central part of the solid-state laser crystal 10. With this, a lateral mode of excellent Gaussian distribution is obtained for the laser light from the solid-state laser crystal 10. Thus, the laser light of the wavelength of 1063 nm of high power and excellent beam quality is injected into the non-linear optic element 50.

Meanwhile, it is known that, in non-linear optic elements, the output of the second harmonics is proportional to the square of the optical power of the incident light. This means that there occurs increase of output in proportion with the beam quality.

According to the laser-diode pumped solid-state laser apparatus 200 of the second embodiment, in which it is possible to inject a high power laser light of excellent beam quality into the non-linear optic element 50, there is attained improvement of efficiency of conversion in the non-linear optic element 50.

Thus, according to the laser-diode pumped solid-state laser apparatus 200 of the second embodiment, it becomes possible to output a laser light of the wavelength of 531.5 nm with excellent beam quality and with high output power, without inviting increase of size of the apparatus.

In the laser-diode pumped solid-state laser apparatus 200 according to the second embodiment explained above, the non-linear optic element 50 may have a length of 5 mm and a thickness of 2 nm, while the present invention is by no means limited to such a specific example. Thus, other construction may be used as long as the laser light of the fundamental mode having the wavelength of 1063 nm is converted to the laser light of the second harmonics of the wavelength of 531.5 nm with desired conversion efficiency.

Third Embodiment

Hereinafter, a laser-diode pumped solid-state laser apparatus according to a third embodiment of the present invention will be described with reference to FIGS. 9A and 9B.

Figure 9A:
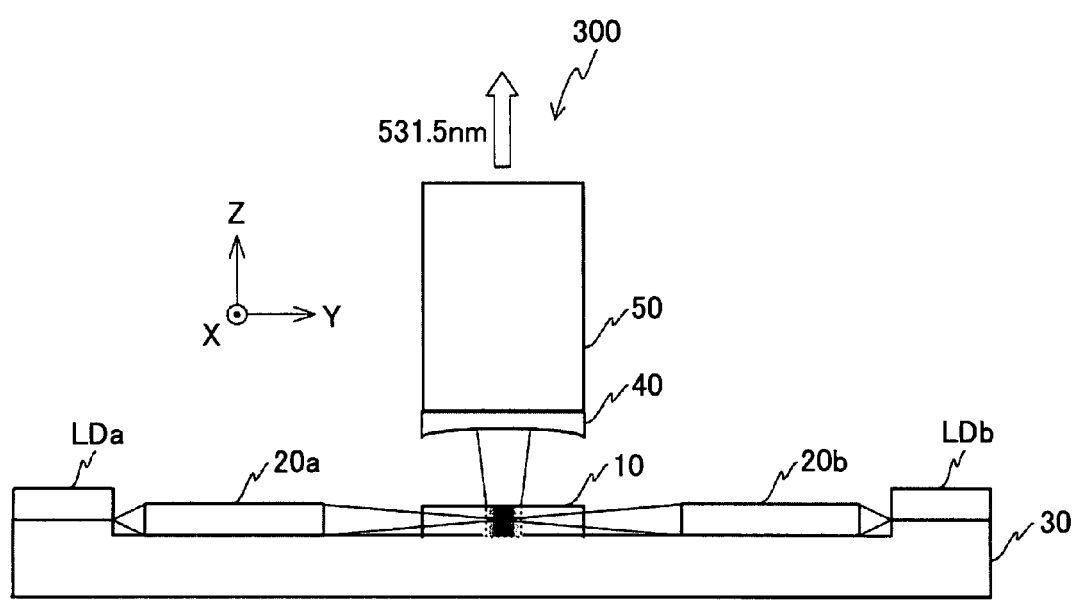

FIG. 9A shows the schematic construction of a laser-diode pumped solid-state laser apparatus 300 according to a third embodiment of the present invention.

Referring to FIG. 9A, the laser-diode pumped solid-state laser apparatus 300 has a construction similar to that of the laser-diode pumped solid-state laser apparatus 200 of the second embodiment, except that the non-linear optic crystal 50 is disposed a the +Z side of the output mirror 40. Otherwise, the construction of the present embodiment is same to that of the second embodiment. Hereinafter, explanation will be made mainly on the difference over the second embodiment. Thereby, it should be noted that the same reference numerals are used for the parts identical to or equivalent to the parts of the second embodiment and the description thereof will be simplified or omitted.

Referring to FIG. 9A, the non-linear optic element 50 is disposed on the optical path of the laser light passed through the output mirror 40. This non-linear optic crystal 50 may have a thickness (length in the Z-axis direction) of 10 mm, for example. It should be noted that, in the case the non-linear optic crystal 50 is disposed inside the optical cavity as in the case of the second embodiment, the non-linear optic crystal 50 may have a small thickness in view of large optical intensity, while in the case of the third embodiment in which the non-linear optic element 50 is disposed outside the optical cavity, it is necessary to achieve the wavelength conversion with one pass of the laser light through the non-linear optic crystal 50, and thus, there is a need of increasing the thickness of the non-linear optic crystal 50 for attain the conversion efficiency comparable to that of the second embodiment.

According t the laser-diode pumped solid-state laser apparatus 300 of the third embodiment, in which the laser light of the wavelength of 1063 nm of high power and excellent beam quality is injected into the non-linear optic element 50, it becomes possible to emit a laser light of the wavelength of 531.5 nm with high beam quality and high output without inviting increase of size of the apparatus, similarly to the laser-diode pumped solid-state laser apparatus 200 according to the second embodiment of the present invention.

In the laser-diode pumped solid-state laser apparatus 300 according to the third embodiment explained above, the non-linear optic element 50 may have a length of 5 mm and a thickness of 10 nm, while the present invention is by no means limited to such a specific example. Thus, other construction may be used as long as the laser light of the fundamental mode having the wavelength of 1063 nm is converted to the laser light of the second harmonics of the wavelength of 531.5 nm with desired conversion efficiency.

Further, with the laser-diode pumped solid-state laser apparatus 300 of the third embodiment, it is also possible to dispose a lens between the output mirror 40 and the non-linear optic crystal 50. With this, it becomes possible to focus the fundamental mode wave incident to the non-linear optic element 50, resulting in improvement of beam strength of the fundamental wave, and the conversion efficiency in the non-linear optic crystal 50 is improved further as a result.

Fourth Embodiment

Hereinafter, a laser-diode pumped solid-state laser apparatus according to a fourth embodiment of the present invention will be described with reference to FIGS. 10A and 10B.

FIG. 10A shows the schematic construction of a laser-diode pumped solid-state laser apparatus 400 according to a fourth embodiment of the present invention.

Referring to FIG. 10A, the laser-diode pumped solid-state laser apparatus 400 has a construction similar to that of the laser-diode pumped solid-state laser apparatus 200 of the second embodiment, except that the specification is changed for the coating on the D surface of the non-linear optic crystal 50 and that the output mirror 40 is eliminated. Otherwise, the construction of the present embodiment is same to that of the second embodiment. Hereinafter, explanation will be made mainly on the difference over the second embodiment. Thereby, it should be noted that the same reference numerals are used for the parts identical to or equivalent to the parts of the second embodiment and the description thereof will be simplified or omitted.

As shown in FIG. 10B, there is provided a coating on the D surface of the non-linear optic crystal 50, wherein the coating thus provided has a reflectance of 99.9% for fundamental mode light of the wavelength of 1063 nm and the transmittance of 99.5% for the second harmonics light of the wavelength of 531.5 nm. Further, on the C surface of the non-linear optic crystal 50, there is provided a coating providing a transmittance of 99.5% or higher for both the fundamental mode light of the wavelength of 1063 nm and the second harmonics light of the wavelength of 531.5 nm.

Thereby, there is formed a cavity 35A by the A surface of the solid-state laser crystal 10 and the D surface of the non-linear optic crystal 50 as shown in FIG. 10B.

Thereby, the solid-state laser crystal 10 and the non-linear optic element 50 are fixed with each other with simple contact or with a photo-resistive adhesive. Thereby, the solid-state laser crystal 10 and the non-linear optic crystal 50 may make an optical contact free from coating.

As explained heretofore, according t the laser-diode pumped solid-state laser apparatus 400 of the fourth embodiment, in which the laser light of the wavelength of 1063 nm of high power and excellent beam quality is injected into the non-linear optic element 50, it becomes possible to emit a laser light of the wavelength of 531.5 nm with high beam quality and high output without inviting increase of size of the apparatus, similarly to the laser-diode pumped solid-state laser apparatus 200 according to the second embodiment of the present invention.

Further, according to the laser-diode pumped solid-state laser apparatus 400 according to the fourth embodiment of the present invention, there is no need of providing the output mirror 40 used with the laser-diode pumped solid-state laser apparatus 200, and it becomes possible to facilitate size reduction further.

Fifth Embodiment

Hereinafter, a laser-diode pumped solid-state laser apparatus excited according to a fifth embodiment of the present invention will be described with reference to FIGS. 11A and 11B.

Figure 11A:
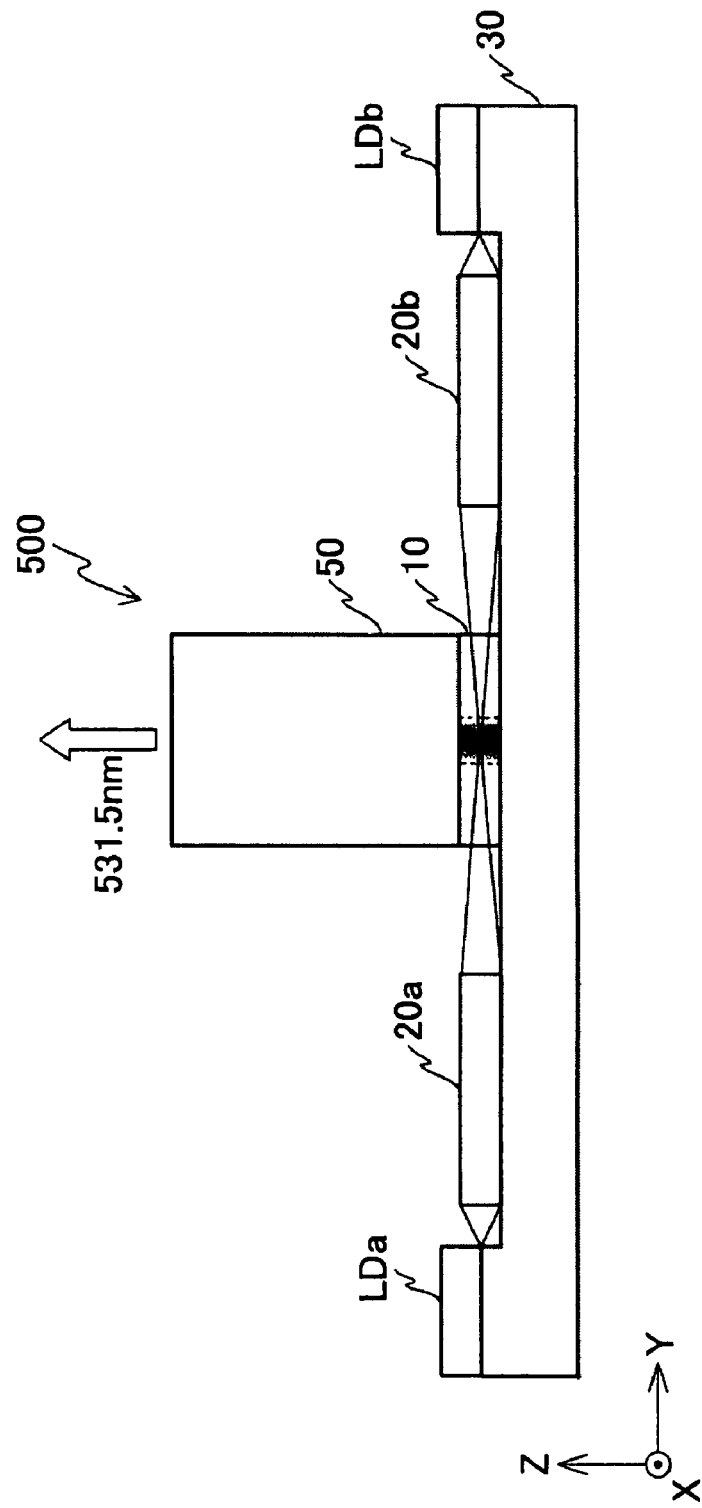

FIG. 11A shows the schematic construction of a laser-diode pumped solid-state laser apparatus 500 according to a fifth embodiment of the present invention.

Referring to FIG. 11A, the laser-diode pumped solid-state laser apparatus 500 has a construction similar to that of the laser-diode pumped solid-state laser apparatus 300 of the second embodiment, except that the specification is changed for the solid-state laser crystal 10 and the non-linear optic crystal 50 and that the output mirror 40 is eliminated. Otherwise, the construction of the present embodiment is same to that of the third embodiment. Hereinafter, explanation will be made mainly on the difference over the third embodiment. Thereby, it should be noted that the same reference numerals are used for the parts identical to or equivalent to the parts of the third embodiment and the description thereof will be simplified or omitted.

On the A surface of the solid-state laser crystal 10, there is provided a coating having a reflectance of 99.9% with regard to the light of the wavelength of 1063 nm as shown in FIG. 11B. Further, as shown in FIG. 11B, there is provided a coating having a transmittance of 5% with regard to the light of the wavelength of 1063 nm on the B surface of the solid-state laser crystal 10.

Thus, there is formed a cavity 35A by the A surface and the B surface of the solid-state laser crystal 10 as shown in FIG. 11B.

Further, on both edge surfaces of the non-linear optic crystal 50, there are provided a coating having a transmittance of 99.5% or more for the second harmonics light of the wavelength of 531.5 nm.

Thereby, the solid-state laser crystal 10 and the non-linear optic element 50 are fixed with each other with simple contact or with a photo-resistive adhesive. Thereby, the solid-state laser crystal 10 and the non-linear optic crystal 50 may make an optical contact free from coating.

As explained heretofore, according t the laser-diode pumped solid-state laser apparatus 500 of the fifth embodiment, in which the laser light of the wavelength of 1063 nm of high power and excellent beam quality is injected into the non-linear optic element 50, it becomes possible to emit a laser light of the wavelength of 531.5 nm with high beam quality and high output without inviting increase of size of the apparatus, similarly to the laser-diode pumped solid-state laser apparatus 300 according to the third embodiment of the present invention.

Further, according to the laser-diode pumped solid-state laser apparatus 500 according to the fifth embodiment of the present invention, there is no need of providing the output mirror 40 used with the laser-diode pumped solid-state laser apparatus 300, and it becomes possible to facilitate size reduction further.

While the second through fifth embodiments have been explained for the case of the output laser light has the wavelength of 131.5 nm, the present invention is not limited to such a particular construction. Thus, by choosing the pitch of polarization reversal or coating specification of the non-linear optic crystal 50 appropriately, it is also possible to obtain an output laser light of the wavelength of 670 nm or 456 nm.

Sixth Embodiment

Hereinafter, a solid-state laser apparatus excited by laser diode according to a sixth embodiment of the present invention will be described with reference to FIG. 12 and FIGS. 13A and 13B, 14A and 14B and 15A and 15B.

Figure 12:
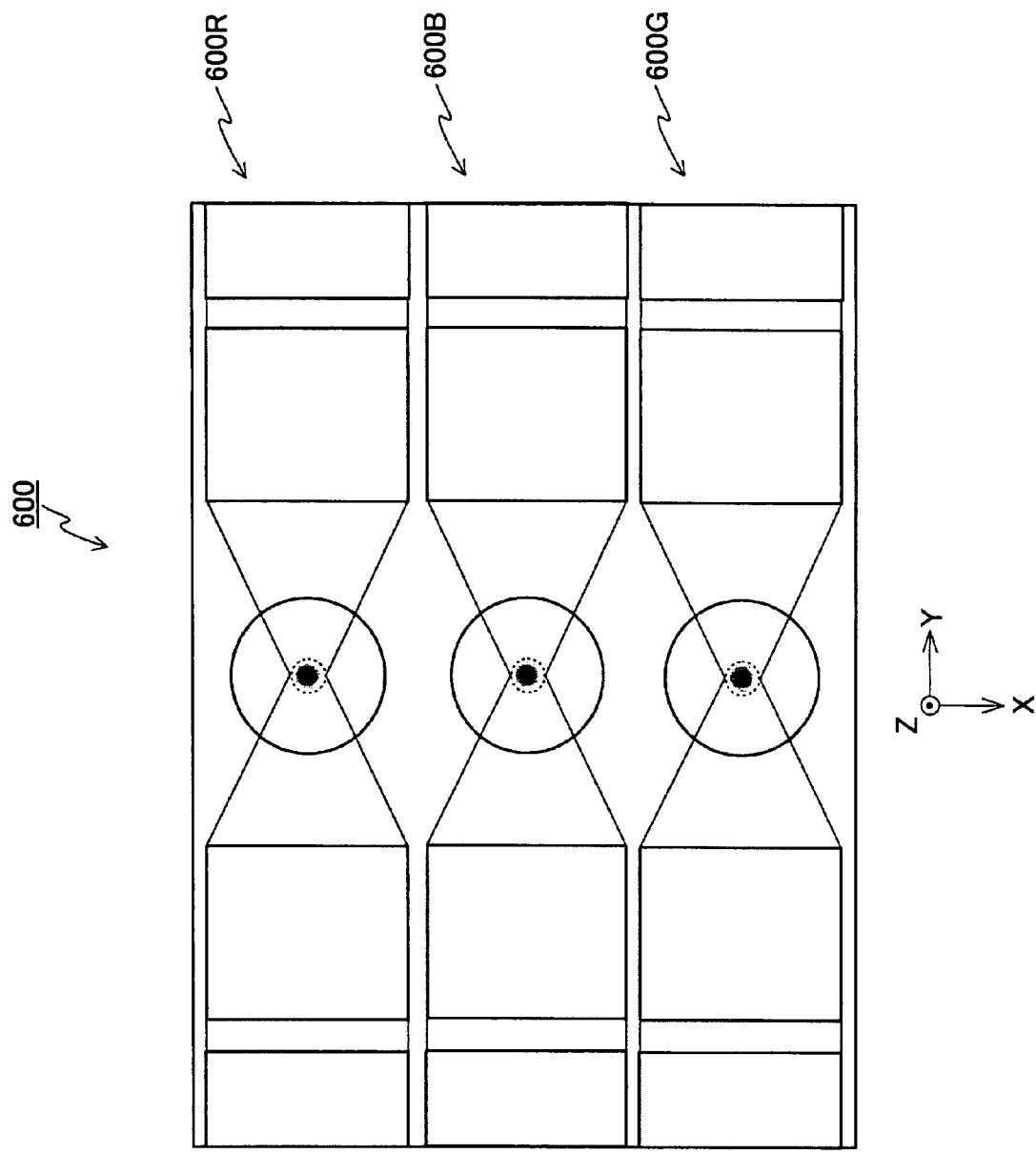
FIG. 12 is a diagram for explaining a laser-diode pumped solid-state laser apparatus according to a sixth embodiment of the present invention.

FIG. 12 shows the schematic construction of a laser-diode pumped solid-state laser apparatus 600 according to a sixth embodiment of the present invention.

The laser-diode pumped solid-state laser apparatus 600 includes: a first solid-state laser apparatus 600R emitting an output laser light of red color with the wavelength of 670 nm; a second solid-state laser apparatus 600B emitting an output laser light of blue color with the wavelength of 456 nm; and a third solid-state laser apparatus 600G emitting an output laser light of green color with the wavelength of 531.5 nm.

Figure 13A:
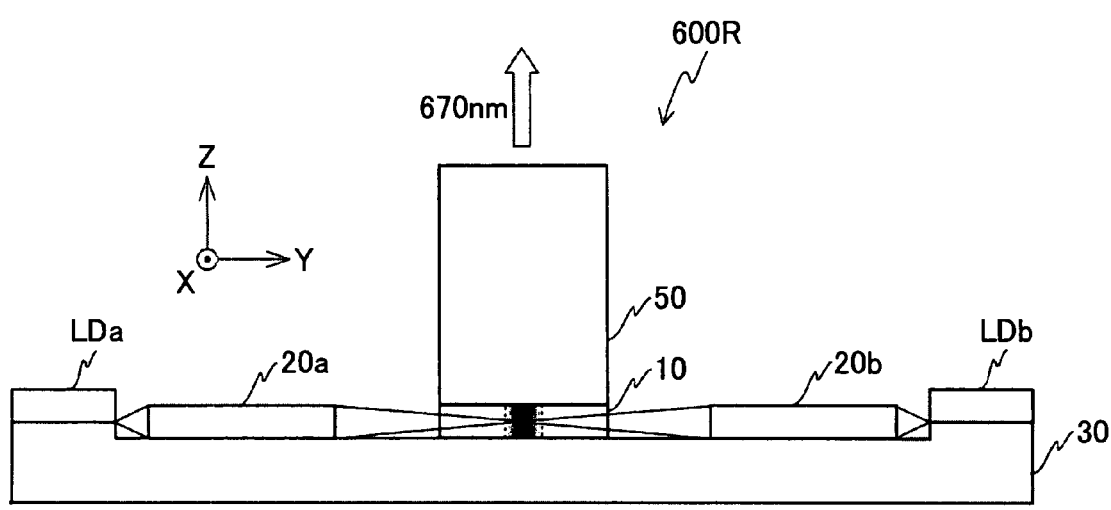

As shown in FIG. 13A, the first solid-state laser apparatus 600R has a construction similar to the laser-diode pumped solid-state laser apparatus 500 according to the fifth embodiment explained before. In one example, there is provided a coating having a reflectance of 99.9% with regard to the light of the wavelength of 1063 nm as shown in FIG. 11B on the A surface of the solid-state laser crystal 10. Further, as shown in FIG. 13B, there is provided a coating having a transmittance of 5% with regard to the light of the wavelength of 1340 nm and the transmittance of 99.9% with regard to the light of the wavelength of 1063 nm on the B surface of the solid-state laser crystal 10. With regard to the material of the solid-state laser crystal 10, the same material as in the case of the laser-diode pumped solid-state laser apparatus 500 of the fifth embodiment may be used. The non-linear optic crystal 50 is a PPMgLN device having a different pitch for the polarization reversal and carries a coating on the respective end surfaces thereof such that a transmittance of 99.5% or more is attained for the light of the wavelength of 1340 nm and the light of the wavelength of 670 nm.

Figure 14A:
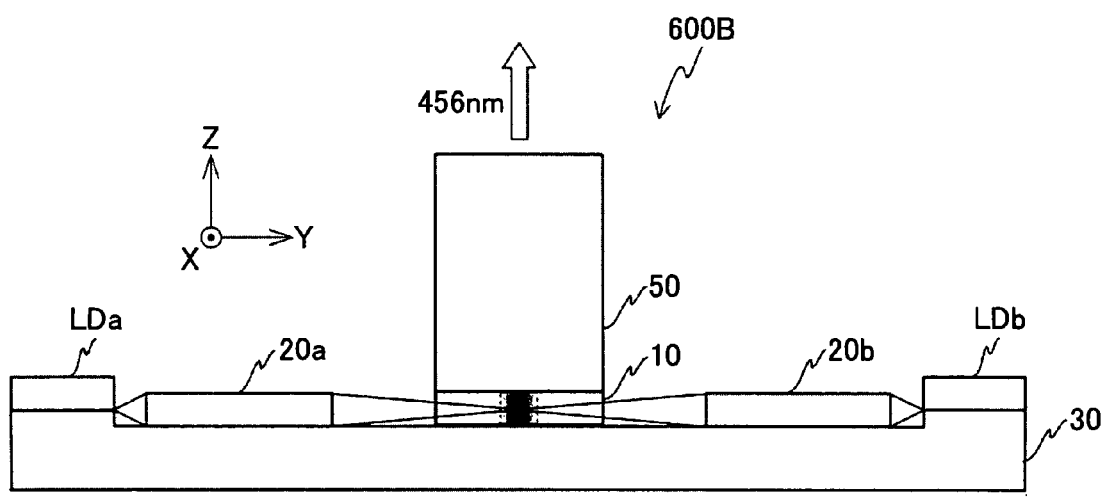
FIGS. 14A and 14B are diagrams for explaining a solid-state laser apparatus 600B of FIG. 12.
Figure 14B:
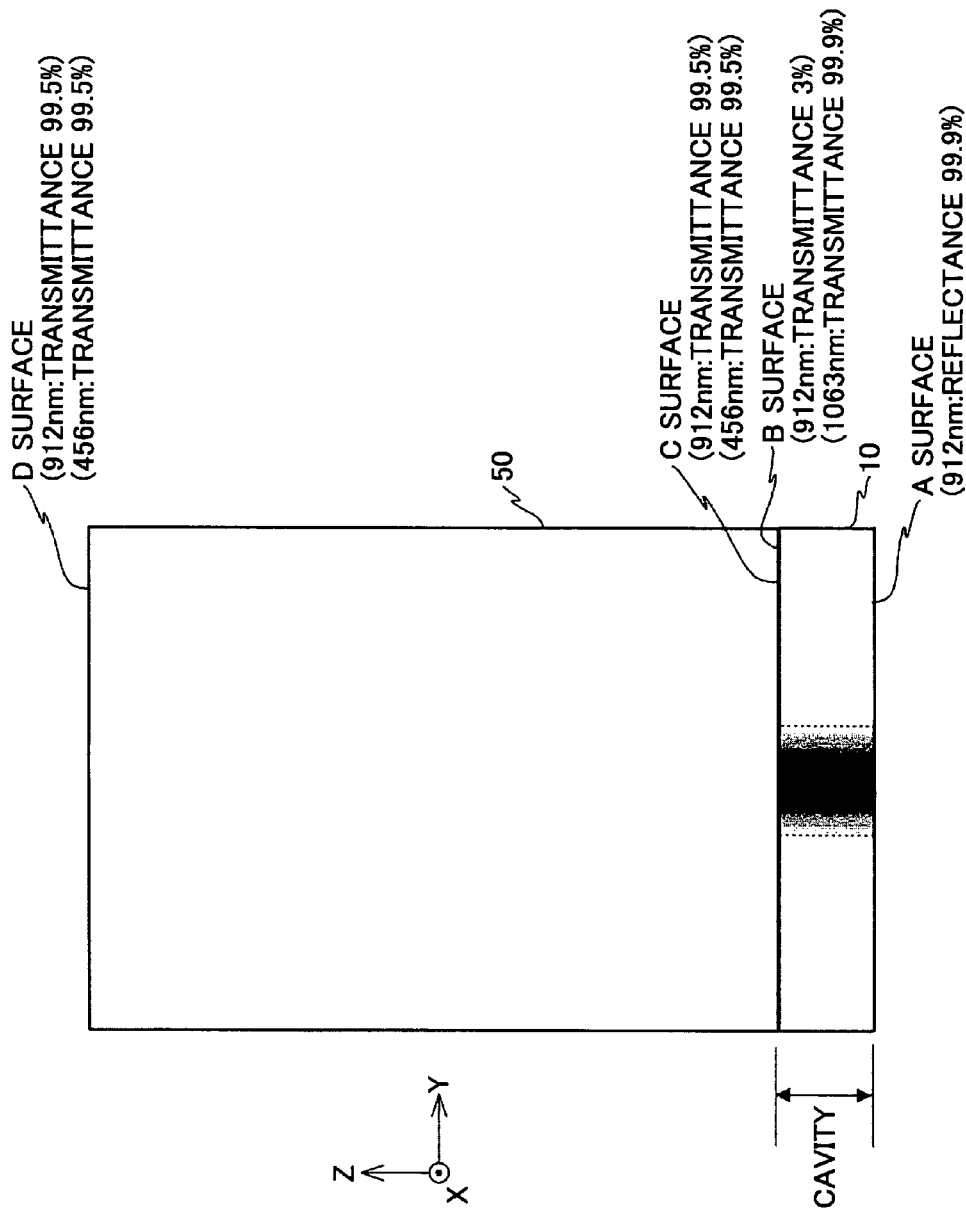

As shown in FIG. 14A, the second solid-state laser apparatus 600B has a construction similar to the laser-diode pumped solid-state laser apparatus 500 according to the fifth embodiment explained before. Thus, in one example, there is provided a coating having a reflectance of 99.9% with regard to the light of the wavelength of 912 nm on the A surface of the solid-state laser crystal 10 as shown in FIG. 14B. Further, as shown in FIG. 14B, there is provided a coating having a transmittance of 3% with regard to the light of the wavelength of 912 nm and the transmittance of 99.9% with regard to the light of the wavelength of 1063 nm on the B surface of the solid-state laser crystal 10. With regard to the material of the solid-state laser crystal 10, the same material as in the case of the laser-diode pumped solid-state laser apparatus 500 of the fifth embodiment may be used. The non-linear optic crystal 50 is a PPMgLN device having a different pitch for the polarization reversal and carries a coating on the respective end surfaces thereof such that a transmittance of 99.5% or more is attained for the light of the wavelength of 912 nm and the light of the wavelength of 456 nm.

Figure 15A:
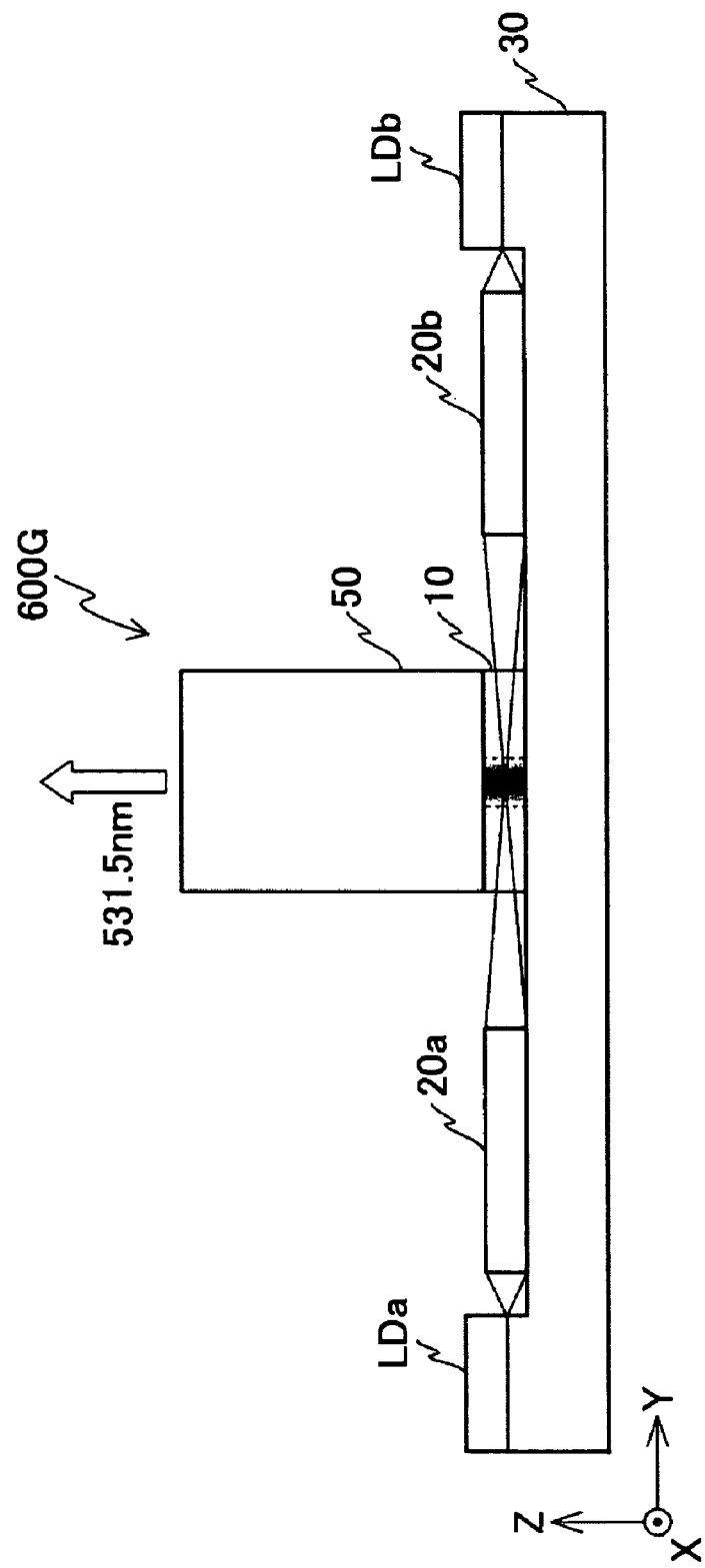

As shown in FIGS. 15A and 15B, the third solid-state laser apparatus 600G has a construction similar to the laser-diode pumped solid-state laser apparatus 500 according to the fifth embodiment explained before.

As explained heretofore, it becomes possible, with the laser-diode pumped solid-state laser apparatus 600 of the sixth embodiment including therein a plurality of solid-state laser apparatuses each having a solid-state laser crystal 10, to provide a plurality of laser output lights of high output power with excellent beam quality, without inviting increase of size of the laser apparatus 600.

In the sixth embodiment, it is possible that each of the solid-state laser apparatuses emits the laser light with the same wavelength.

Further, while explanation has been made for the case of the laser apparatus includes three solid-state laser apparatuses, the present invention is by no means limited to such a construction. Thus, the laser-diode pumped solid-state laser apparatus 600 may include two solid-state laser apparatuses or four or more solid-state laser apparatuses.

While the second through sixth embodiment has been explained for the case of using the PPMgLN device, it should be noted that the present invention is not limited to such a specific construction. Thus, any non-linear optic crystal having a function equivalent to the PPMgLN device may be used.

Seventh Embodiment

Hereinafter, a laser-diode pumped solid-state laser apparatus according to a seventh embodiment of the present invention will be described with reference to FIGS. 16A and 16B.

FIG. 16A shows the schematic construction of a laser-diode pumped solid-state laser apparatus 700 according to a seventh embodiment of the present invention.

Referring to FIG. 16A, the laser-diode pumped solid-state laser apparatus 700 is an apparatus of the edge pumping structure and includes a laser diode LD for pumping, a lens 20, the solid-state laser crystal 10 and the output mirror 40.

The laser-diode LD is a device of single-stripe structure and can produce a laser light of the wavelength of 808 nm with an output power of 2 W. In the illustrated example, the laser diode LD emits a laser light in the +Z direction.

The lens 20 is disposed at the +Z side of the laser diode LD and focuses the pumping laser light from the laser diode LD upon the solid-state laser crystal 10. For example, the lens 20 may be the element capable of focusing the pumping laser light to form a beam with a beam diameter of about 1 mm.

The solid-state laser crystal 10 is disposed at the +Z side of the lens 20. Further, as shown in FIG. 16B, the surface of the solid-state laser crystal 10 at the side where the lens 20 is provided (the surface at −Z side, designated as "E surface" for the sake of convenience) is provided with a coating providing a reflectance of 99.9% for the light of the wavelength of 808 nm and a transmittance of 0.1% for the light of the wavelength of 1063 nm. Further, as shown in FIG. 16B, the surface of the solid-state laser crystal 10 at the side opposite to the E surface (the surface at +Z side, designated as "F surface" for the sake of convenience) is provided with a coating providing a transmittance of 99.9% for the light of the wavelength of 1063 nm.

Further, there is disposed an output mirror 40 at the +Z side of the solid-state laser crystal 10. This output mirror 40 has a radius of curvature of 5000 mm at the −Z side surface and has a transmittance of 5% to the light of the wavelength of 1063 nm.

Thereby, there is formed a cavity 35C by the E surface of the solid-state laser crystal 10 and the output mirror 40 as shown in FIG. 16B.

In the illustrated example, the distance between the E surface of the solid-state laser crystal 10 and surface of the output mirror 40 at the −Z surface is set to 100 mm. Further, the laser light forms a beam of the beam diameter of 0.5 mm inside the solid-state laser crystal 10.

It should be noted that the output mirror 40 may have a so-called microchip construction integrated with the solid-state laser crystal 10.

Next, the operation of the laser-diode pumped solid-state laser apparatus 700 of the foregoing construction will be explained briefly.

The laser light (pumping laser light) of the wavelength of 808 nm emitted from the laser diode LD passes through the lens 20 and enters into the solid-state crystal 10. Thereby, the Nd dopant element in the solid-state laser crystal 10 undergoes excitation by the pumping laser light and there is caused laser oscillation by the cavity 35C formed by the E surface of the solid-state laser crystal 10 and the output mirror 40 with the wavelength of 1063 nm. That laser light of the wavelength of 1063 nm is then emitted after passing through the output mirror 40.

Meanwhile, with a laser-diode pumped solid-state laser apparatus of the edge pumping structure, it is generally known that the beam shape (spot shape) of the focused pumping laser light provides a profound influence on the beam quality of the laser light (output laser light) emitted from the laser-diode pumped solid-state laser apparatus.

According to the laser-diode pumped solid-state laser apparatus 700 of the seventh embodiment thus provided with the solid-state laser crystal 10 that includes a uniaxial monocrystal of gadolinium vanadate ($GdVO_4$) doped with Nd, which undergoes excitation by the pumping laser lights from the pumping laser diode LD, wherein Nd is doped with such a concentration profile that the concentration of Nd increases gently in the sloped shape from near zero concentration in the direction perpendicular to the laser oscillation direction (X-axis direction in the present example). As a result, it becomes possible to obtain a high-quality laser output without shaping the spot shape or optical intensity distribution for the pumping laser light. Thus, it becomes possible to provide a laser light output of high beam quality, without inviting increase of size of the solid-state laser apparatus.

Figure 17A:
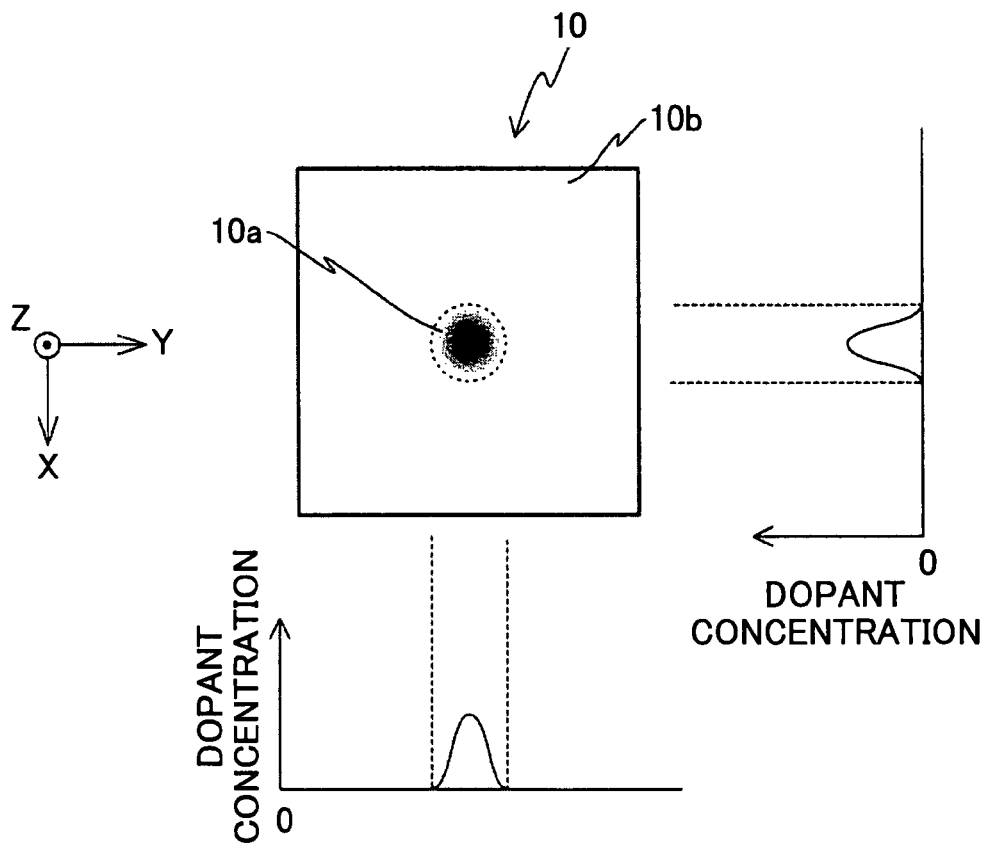
FIGS. 17A and 17B are diagrams for explaining a modification of the solid-state laser crystal.
Figure 17B:
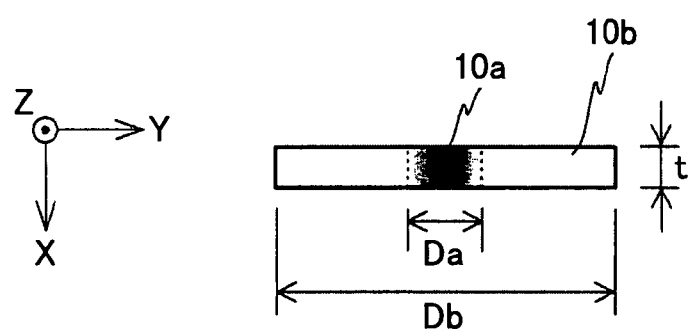

While explanation has been made in the foregoing embodiments with regard to the case of using a disc-shaped (or chip-shaped) crystal for the solid-state laser crystal 10, the present invention is by no means limited to such a specific example, and thus, the solid-state laser crystal 10 may also be the one having a rectangular plate shape as shown in FIGS. 17A and 17B, wherein the solid-state laser crystal 10 of FIGS. 17A and 17B may be manufactured by cutting a periphery of a rod-shaped crystal ingot produced by a dual-die EFG process or μPD process, followed by a slicing process. Further, the solid-state laser crystal 10 may also have a polygonal shape.

While explanation has been made in the embodiments heretofore with regard to the case of using $GdVO_4$ for the material of the solid-state laser crystal 10, the present invention is not limited to such a specific example and it is also possible to use a crystal of yttrium vanadate ($YVO_4$) or other crystal.

Further, while explanation has been made in the embodiments heretofore with regard to the case of using Nd for the dopant element of the solid-state laser crystal 10, the present invention is not limited to such a specific example and it is also possible to use other rare earth element or metal ions. Further, the concentration of the dopant element is not limited to 0.5 at %.

Further, while explanation has been made in each of the foregoing embodiments of using a uniaxial monocrystal for the solid-state laser crystal 10, the present invention is not limited to such a specific construction and it is also possible to use a biaxial monocrystal.

Further, while explanation has been made in the foregoing embodiments for the ease of the solid-state laser crystal 10 has a thickness t of 0.5 mm, the diameter Da of 5 mm and the diameter db of 1 mm, the present invention is not limited to such a specific construction. The dimensions of the solid-state laser crystal 10 may be changed as needed according to the beam quality demanded for the output laser light.

<<Laser Printer>>

Figure 18:
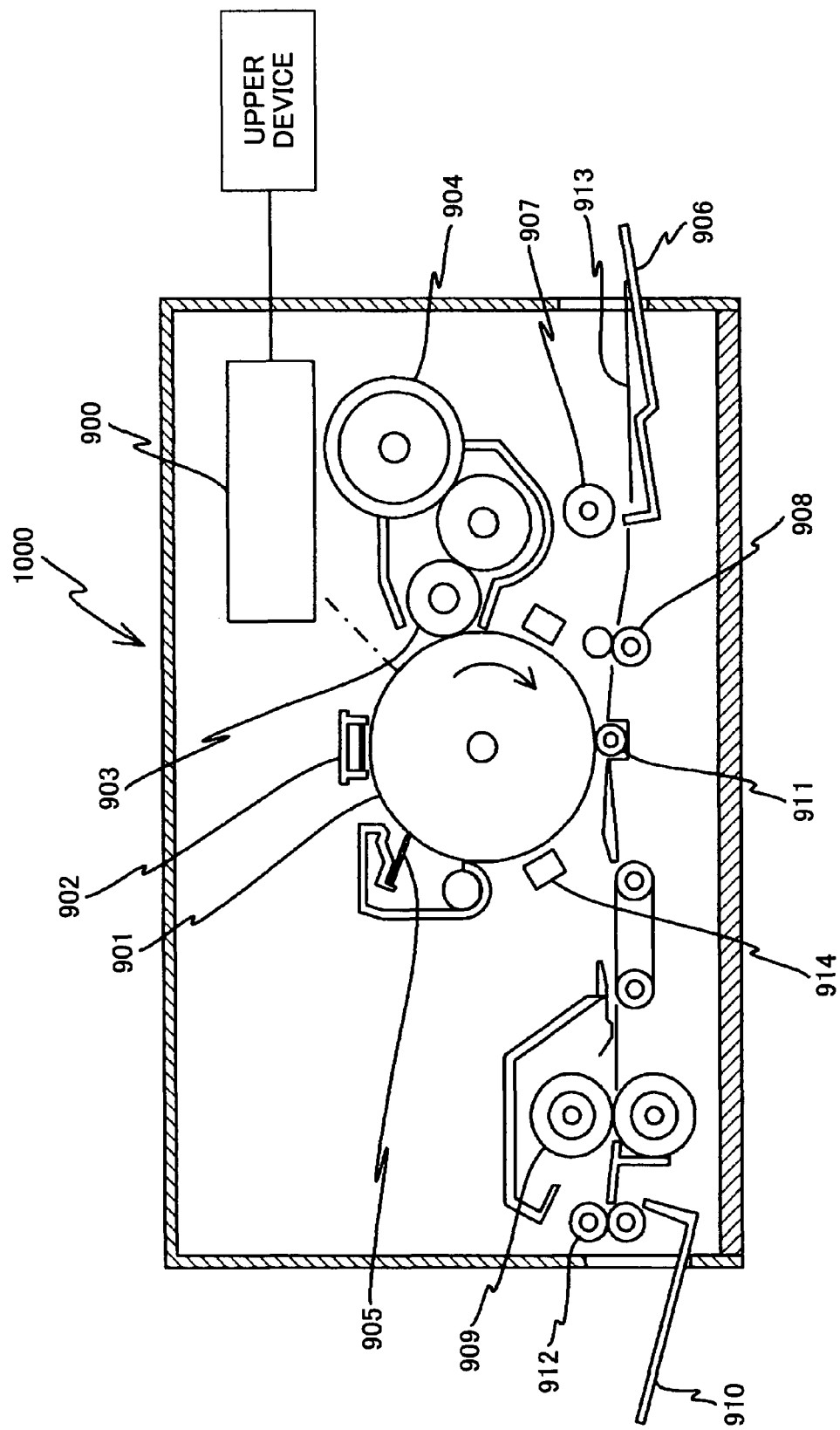
FIG. 18 is a diagram for explaining the schematic construction of a laser printer according to an embodiment of the present invention.

FIG. 18 shows a schematic construction of a laser printer 1000 as an image forming apparatus according to an embodiment of the present invention.

Referring to FIG. 18, the laser printer 1000 comprises an optical scanning apparatus 900, a photosensitive drum 901, an electrostatic charger 902, a developing roller 903, a toner cartridge 904, a cleaning blade 905, a sheet feed tray 906, a sheet feed roller 907, resist roller pairs 908, a transfer charger 911, discharging unit 914, a fixing roller 909, a sheet discharging roller 912, a sheet discharging tray 910, and the like.

The electrostatic charger 902, the developing roller 903, the transfer charger 911, the discharging unit 914 and the cleaning blade 905 are disposed in the vicinity of the photosensitive drum 901. Thereby, the electrostatic charger 902, the developing roller 903, the transfer charger 911, the discharging unit 914 and the cleaning blade 905 are disposed in the order of: electrostatic charger 902→developing roller 903→transfer charger 911→discharging unit 914→cleaning blade 905, along the rotating direction of the photosensitive drum 901.

The photosensitive drum 901 carries thereon a photosensitive layer. In the present example, the photosensitive drum 901 rotates in the clockwise direction (arrow direction) within the plane of FIG. 18.

The electrostatic charger 902 charges the surface of the photosensitive drum 901 uniformly.

The optical scanning apparatus 900 irradiates a modulated light upon the surface of the photosensitive drum 901 charged with the electric charger 902 with modulation based upon the image information from upper hierarchy apparatus such as personal computer. With this, there is formed a latent image corresponding to the image information on the surface of the photosensitive drum 901. The latent image thus formed is moved in the direction of the developing roller 903 with rotation of the photosensitive drum 905. It should be noted that the elongating direction of the photosensitive drum 901 (direction along the rotational axis) is called "main scanning direction" and the rotational direction of the photosensitive drum 901 is called "sub-scanning direction". This construction of this optical scanning apparatus 900 will be explained later.

The toner cartridge 904 holds toners, and the toners are supplied therefrom to the developing roller 903.

Thus, the developing roller 903 causes the toners supplied from the toner cartridge 904 to adhere to the latent image formed on the surface of the photosensitive drum 901, and with this, development of the image information is attained. The latent image thus formed is moved in the direction of the transfer charger 911 with rotation of the photosensitive drum 901.

The sheet feed tray 906 accommodates therein recording sheets 913. Further, there is disposed a sheet feed roller 907 in the vicinity of the sheet feed tray 906, and the sheet feed roller 907 picks up the recording sheet 913 one by one from the sheet feed tray 906 and supplies the same to the resist roller pair 908. The resist roller pair 908 is disposed in the vicinity of the transfer roller 911 and holds the recording sheet 913 picked up by the sheet feed roller 907 temporarily and supplies the recording sheet to the gap between the photosensitive drum 901 and the transfer charger 911 in synchronization with the rotation of the photosensitive drum 901.

Thereby, the transfer charger 911 is applied with a voltage of reverse polarity to the toners for attracting the toners on the surface of the photosensitive drum 901 to the recording sheet 913 electrically. With this voltage, the toner image on the surface of the photosensitive drum 901 is transferred to the recording sheet 913. The recording sheet 913 thus transferred with the toner image is then forwarded to the fixing roller 909.

With this fixing roller 909, heat and pressure is applied to the recording sheet 913 and the toner image is fixed upon the recording sheet 913. The recording sheet 913 thus fixed with the toner image is forwarded to the sheet discharge tray 901 via the sheet discharging roller 912 and is stuck upon the sheet discharge tray 910 one by one.

The discharging unit 914 discharges the surface of the photosensitive drum 901.

The cleaning blade 905 removes the toner (residual toner) remaining on the surface of the photosensitive drum 901. The residual toners thus removed are used again. After removal of the residual toners, the photosensitive drum 901 returns to the position of the electrostatic charger 902.

<<Optical Scanning Apparatus>>

Figure 19:
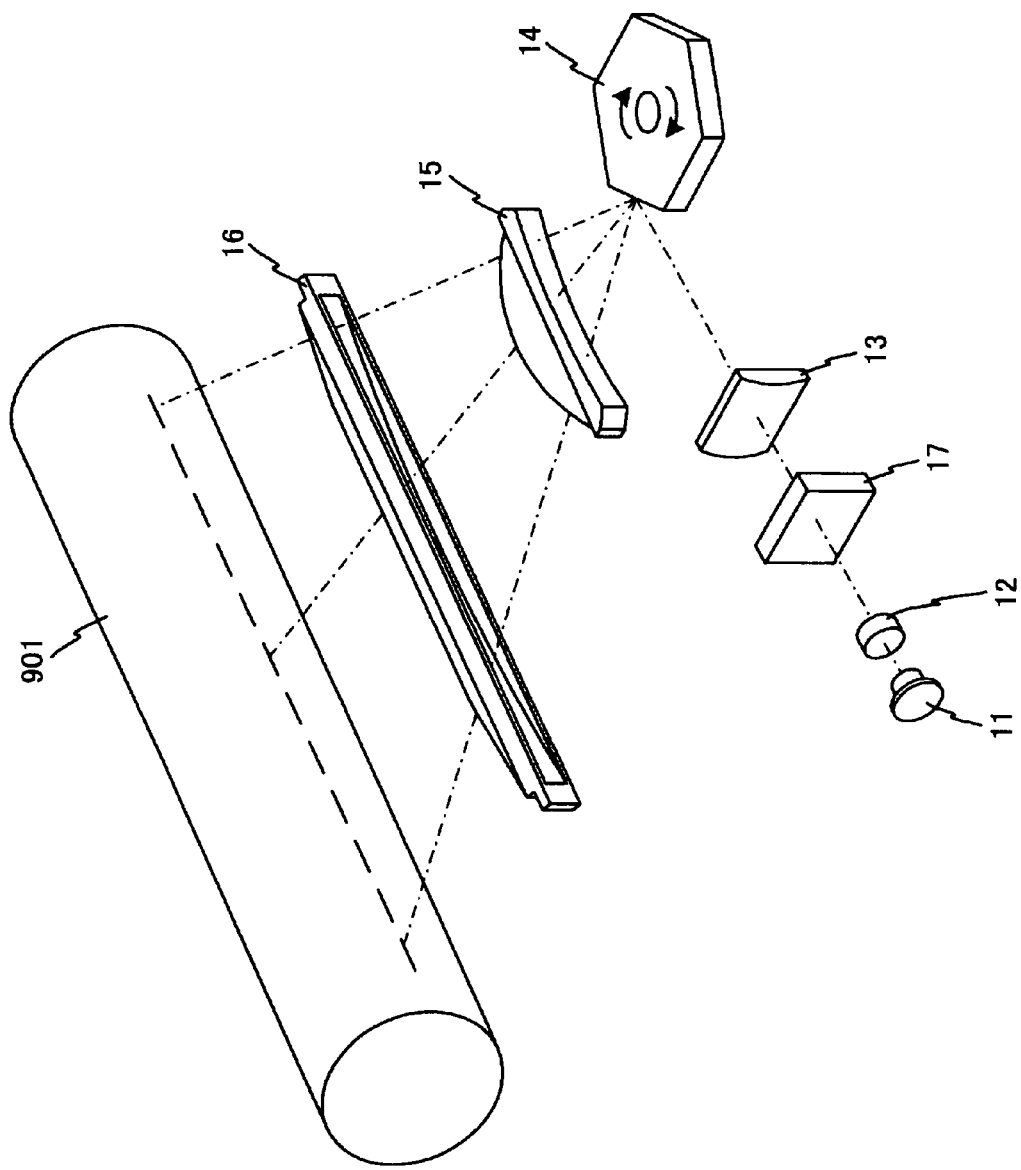
FIG. 19 is a diagram explaining the schematic construction of an optical scanning apparatus used in the laser printer of FIG. 18.

Next, the construction and function of the optical scanning apparatus 900 will be explained with reference to FIG. 19.

The optical scanning apparatus comprises an optical source 11, a coupling lens 12, a modulator 17, a cylindrical lens 13, a polygonal mirror 14, a fθ lens 15 a toroidal lens and a main controller not illustrated but used for controlling the foregoing various parts, wherein the optical source 11 includes a laser apparatus equivalent to any of the laser-diode pumped solid-state laser apparatus 100-500 and 700 explained previously.

The coupling lens 12 shapes the optical beam emitted from the optical source 11 to form a generally parallel light.

The modulator 17 turns on and off the optical beam passed through the coupling lens 12.

The cylindrical lens 13 focuses the optical beam passed through the modulator 17 upon a reflection surface of the polygonal mirror 14.

The polygonal mirror 14 has a right hexagonal pillar member of low profile and carries six deflection surfaces on the lateral side thereof. Further, the polygonal mirror 14 is rotated at a constant angular velocity in the direction of arrow indicated in FIG. 19. Thus, the optical beam emitted from the optical source 11 and is focused upon the deflection surface of the polygonal mirror 14 by the cylindrical lens 13 undergoes deflection with a constant angular velocity with rotation of the polygonal mirror 14.

The fθ lens 15 has an image height proportional to the incident angle of the optical beam from the polygonal mirror 14 and causes the image plane of the optical beam deflected by the polygonal mirror 14 with the constant angular velocity with an equal speed in the main scanning direction.

The toroidal lens 16 focuses the optical beam passed through the fθ lens 15 on the surface of the photosensitive drum 901.

As explained heretofore, according to the optical scanning apparatus 900 of the present embodiment, it becomes possible to scan the surface of the photosensitive drum 901 with high precision in view of the fact that the optical scanning apparatus 900 includes, for the optical source 11 thereof, a laser apparatus equivalent to any of the laser-diode pumped solid-state laser apparatuses 100-500 and 700.

Further, according to the laser printer 1000 of the present embodiment, it becomes possible to form high-quality images in view of the fact that the laser printer 1000 includes the optical scanning apparatus 900, which in turn includes a laser-diode pumped solid laser apparatus equivalent to any of the laser-diode pumped solid laser apparatuses 100-500 or 700 noted before.

Further, in the optical scanning apparatus 900 of the foregoing embodiment, the optical source 11 may include the foregoing laser apparatus in plural numbers. In such a case, it becomes possible to carry out plural scanning simultaneously, and as a result, it becomes possible to form images with high speed with the laser printer 1000.

Further, with the foregoing embodiment, it is possible to use a MEMS (micro elector mechanical systems) mirror in place of the polygonal mirror 14. In this case, the deflection direction of the optical beam is controlled by controlling the deflection angle of the MEMS mirror.

Further, while the foregoing embodiment has been explained for the case in which the image forming apparatus in the laser printer 1000, the present invention is by no means limited to this specific application. In summary, it becomes possible to form high-quality images with stability by using the laser apparatus equivalent to any of the laser-diode pumped solid-state laser apparatuses 100-500 or 700 for the image forming apparatus.

Further, the image forming apparatus may be the one that includes a laser apparatus equivalent to any of the laser-diode pumped solid-state laser apparatuses 100-700 and irradiates the laser beam directly to the medium such as a sheet that shows coloring with laser irradiation.

<<Display Apparatus>>

Figure 20:
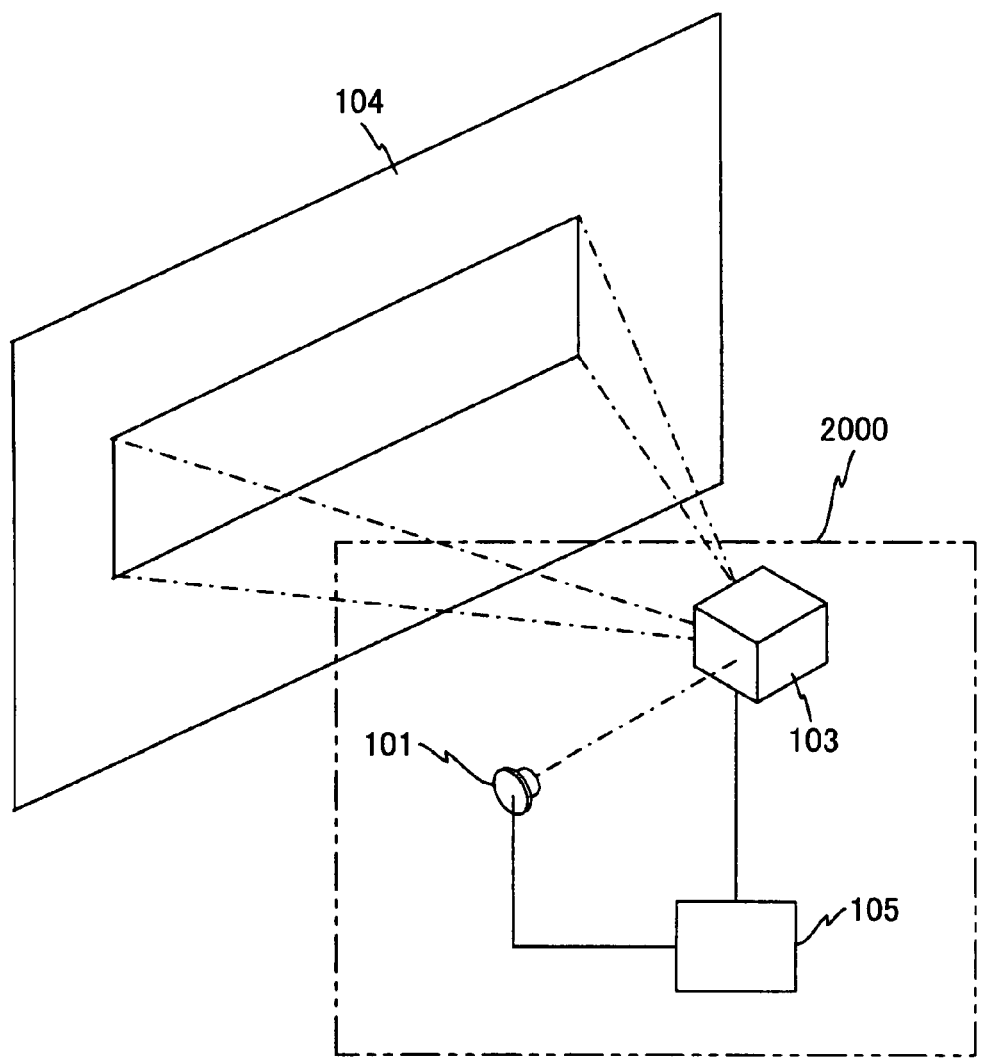
FIG. 20 is a diagram for explaining a laser printer according to an embodiment of the present invention.

FIG. 20 shows a schematic construction of a laser display apparatus 2000 as a display apparatus according to an embodiment of the present invention.

The laser display apparatus 2000 comprises an optical source 101, an optical system 103 including a mirror and directing a laser light from the optical source 101 to a screen 104, and a control apparatus 105 for controlling the optical source 101 and the optical system 103, wherein the optical source 101 includes a laser apparatus equivalent to any of the laser-diode pumped solid-state laser apparatuses 100-700.

Thus, with the laser display apparatus 2000 of the present embodiment, it becomes possible to draw pictures or characters on the screen 104 with high quality as a result of use of any of the laser-diode pumped solid-state laser apparatuses 100-700 for the optical source of the laser light.

Further, with the use of the present invention also for the optical source 101, it is possible to improve the display effect with the laser display apparatus that performs image display by laser lights penetrating through the space.

INDUSTRIAL APPLICABILITY

As explained heretofore, the laser-diode pumped solid-state laser apparatus can provide the laser light of excellent beam quality without inviting increase of size of the laser apparatus. Further, according to the optical scanning apparatus of the present invention, it becomes possible to scan a surface with high precision. Further, according to the image forming apparatus of the present invention, it becomes possible to form high-quality images. Further, according to the display apparatus of the present invention, it becomes possible to display information with high display quality.

Further, the present invention is by no means limited to the embodiments described heretofore, but various variations and modifications may be made without departing from the scope of the invention.

The present invention is based on Japanese priority application No. 2006-178884 filed on Jun. 29, 2006, the entirety of which are incorporated herein as reference.

What is claimed is:

1. A laser-diode pumped solid-state laser apparatus, comprising:
    at least one laser diode producing a pumping laser light;
    at least one laser light generator comprising a monocrystalline substance doped with a dopant element and pumped with said pumping laser light from said at least one laser diode,
    said monocrystalline substance containing said dopant element with a concentration profile such that said dopant element increases a concentration thereof in a direction perpendicular to a laser oscillation direction gently in the form of a slope from a near zero concentration, wherein said monocrystalline substance is a plate-like crystal having a thickness direction in a laser oscillation direction, the crystal having two surfaces with widths greater than the thickness of the crystal, and wherein one surface is reflective and the other surface is transmissive;
    at least one mirror provided next to the transmissive surface of the crystal forming a cavity between the mirror and the reflective surface of the crystal; and
    at least one optical system comprising a plurality of lenses to inject said pumping laser light into the monocrystalline substance.

2. The laser-diode pumped solid-state laser apparatus as claimed in claim 1, wherein said concentration profile provides a high concentration for said dopant element at a central part of said monocrystalline substance and wherein said concentration of said dopant element decreases gradually with increased distance from said central part, the monocrystalline substance having a donut-shaped portion at the periphery that does not contribute to laser oscillation.

3. The laser-diode pumped solid-state laser apparatus as claimed in claim 1, wherein said monocrystalline substance is any of a uniaxial crystal or a biaxial crystal.

4. The laser-diode pumped solid-state laser apparatus as claimed in claim 1, wherein said laser light for pumping causes excitation of said dopant element via a sidesurface of said monocrystalline substance.

5. The laser-diode pumped solid-state laser apparatus as claimed in claim 1, wherein said laser light for pumping causes excitation in said dopant element via the circular surface at one side of said monocrystalline substance.

6. The laser-diode pumped solid-state laser apparatus as claimed in claim 1, wherein said at least one laser light generator comprises a non-linear crystal disposed in an optical path of a laser light penetrated through said monocrystalline substance, said non-linear crystal converting a wavelength of said laser light.

7. The laser-diode pumped solid-state laser apparatus as claimed in claim 1, wherein said at least one laser light generator produces a laser light in the form of a linearly polarized laser light.

8. The laser-diode pumped solid-state laser apparatus as claimed in claim 1, wherein said laser-diode pumped solid-state laser apparatus includes therein said laser light generator in plural numbers.

9. The laser-diode pumped solid-state laser apparatus as claimed in claim 8, wherein said plurality of laser light generators produce respective laser lights with mutually different wavelengths.

10. An optical scanning apparatus scanning a surface by an optical beam, said optical scanning apparatus comprising at least one laser-diode pumped solid-state laser apparatus each comprising:

at least one laser diode producing a pumping laser light;

at least one laser light generator comprising a monocrystalline substance doped with a dopant element and pumped with said pumping laser light from said at least one laser diode, said monocrystalline substance containing said dopant element with a concentration profile such that said dopant element increases a concentration thereof in a direction perpendicular to a laser oscillation direction gently in the form of a slope from a near zero concentration, wherein said monocrystalline substance is a plate-like crystal having a thickness direction in a laser oscillation direction, the crystal having two surfaces with widths greater than the thickness of the crystal, and wherein one surface is reflective and the other surface is transmissive;

at least one mirror provided next to the transmissive surface of the crystal forming a cavity between the mirror and the reflective surface of the crystal; and at least one optical system comprising a plurality of lenses to inject said pumping laser light into the monocrystalline substance.

11. An image forming apparatus forming an image on an object by a laser light, said image forming apparatus comprising at least one laser-diode pumped solid-state laser apparatus each comprising:

at least one laser diode producing a pumping laser light;

at least one laser light generator comprising a monocrystalline substance doped with a dopant element and pumped with said pumping laser light from said at least one laser diode, said monocrystalline substance containing said dopant element with a concentration profile such that said dopant element increases a concentration thereof in a direction perpendicular to a laser oscillation direction gently in the form of a slope from a near zero concentration, wherein said monocrystalline substance is a plate-like crystal having a thickness direction in a laser oscillation direction, the crystal having two surfaces with widths greater than the thickness of the crystal, and wherein one surface is reflective and the other surface is transmissive;

at least one mirror provided next to the transmissive surface of the crystal forming a cavity between the mirror and the reflective surface of the crystal; and at least one optical system comprising a plurality of lenses to inject said pumping laser light into the monocrystalline substance.

12. A display apparatus displaying information by a laser light, said image forming apparatus comprising at least one laser-diode pumped solid-state laser apparatus each comprising:

at least one laser diode producing a pumping laser light;

at least one laser light generator comprising a monocrystalline substance doped with a dopant element and pumped with said pumping laser light from said at least one laser diode, said monocrystalline substance containing said dopant element with a concentration profile such that said dopant element increases a concentration thereof in a direction perpendicular to a laser oscillation direction gently in the form of a slope from a near zero concentration, wherein said monocrystalline substance is a plate-like crystal having a thickness direction in a laser oscillation direction, the crystal having two surfaces with widths greater than the thickness of the crystal, and wherein one surface is reflective and the other surface is transmissive;

at least one mirror provided next to the transmissive surface of the crystal forming a cavity between the mirror and the reflective surface of the crystal; and at least one optical system comprising a plurality of lenses to inject said pumping laser light into the monocrystalline substance.

* * * * *